(12) United States Patent
Yang et al.

(10) Patent No.: US 11,956,831 B2
(45) Date of Patent: Apr. 9, 2024

(54) METHOD AND DEVICE FOR TRANSMITTING/RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 17/267,450

(22) PCT Filed: Aug. 9, 2019

(86) PCT No.: PCT/KR2019/010164
§ 371 (c)(1),
(2) Date: Feb. 9, 2021

(87) PCT Pub. No.: WO2020/032745
PCT Pub. Date: Feb. 13, 2020

(65) Prior Publication Data
US 2021/0329704 A1    Oct. 21, 2021

Related U.S. Application Data

(60) Provisional application No. 62/716,956, filed on Aug. 9, 2018.

(51) Int. Cl.
*H04W 74/08* (2009.01)
*H04B 17/318* (2015.01)
(Continued)

(52) U.S. Cl.
CPC ...... *H04W 74/0833* (2013.01); *H04B 17/318* (2015.01); *H04L 5/0048* (2013.01);
(Continued)

(58) Field of Classification Search
CPC . H04W 74/0833; H04W 24/08; H04W 72/23; H04W 76/28; H04B 17/318; H04L 5/0048
See application file for complete search history.

(56) References Cited

U.S. PATENT DOCUMENTS

2018/0049269 A1*  2/2018  Fujishiro .............. H04W 76/28
2018/0220450 A1   8/2018  Aiba et al.
(Continued)

FOREIGN PATENT DOCUMENTS

KR        101814051      1/2018
KR     1020180081372     7/2018

OTHER PUBLICATIONS

LG Electronics Inc., "Considerations on 2-Step CBRA procedure for NR-U SA," R2-1809940, 3GPP TSG-RAN WG2 #AH-1807, Montreal, Canada, dated Jul. 2-6, 2018, 5 pages.

(Continued)

*Primary Examiner* — Deepa Belur
(74) *Attorney, Agent, or Firm* — Fish & Richardson P.C.

(57) ABSTRACT

In the transmission of message A corresponding to a 2-step random access process or message 1 corresponding to a 4-step random access process, a method and a device for transmitting/receiving a signal in a wireless communication system, according to one embodiment of the present invention, use an option in which an RO for a PRACH transmission for each message is set differently, or an option in which an RO for a PRACH transmission for each message is shared and PI is set differently.

12 Claims, 17 Drawing Sheets

(51) Int. Cl.
- *H04L 5/00* (2006.01)
- *H04W 24/08* (2009.01)
- *H04W 72/23* (2023.01)
- *H04W 74/0833* (2024.01)
- *H04W 76/28* (2018.01)

(52) U.S. Cl.
CPC ........... *H04W 24/08* (2013.01); *H04W 72/23* (2023.01); *H04W 76/28* (2018.02)

(56) References Cited

U.S. PATENT DOCUMENTS

| | | | | |
|---|---|---|---|---|
| 2021/0014903 | A1* | 1/2021 | Zhang | H04W 76/30 |
| 2021/0126698 | A1* | 4/2021 | Tsai | H04B 7/088 |
| 2022/0240324 | A1* | 7/2022 | Ko | H04W 76/28 |
| 2023/0199895 | A1* | 6/2023 | Zhang | H04W 76/27 370/329 |
| 2023/0247401 | A1* | 8/2023 | Yu | H04W 72/54 455/414.1 |
| 2023/0319890 | A1* | 10/2023 | Wang | H04W 74/0833 370/329 |

OTHER PUBLICATIONS

Nokia, Nokia Shanghai Bell, "2-step RACH Procedure Feature Lead Summary," R1-1907726, 3GPP TSG RAN WG1 #97, Reno, USA, dated May 13-17, 2019, 56 pages.

PCT International Search Report and Written Opinion in International Appln. No. PCT/KR2019/010164, dated Nov. 27, 2019, 18 pages (with English translation).

Zte, "Considerations on channel access procedure for NR-U," R2-1807253, 3GPP TSG RAN WG2 Meeting #102, Busan, Korea, dated May 21-25, 2018, 7 pages.

* cited by examiner (a) Carrier aggregation between L-band and U-band (b) Standalone U-band(s)

| Msg8 for A-UE 1 | Msg2 for A-UE 2 | Msg2 for L-UE 1 | Msg8 for A-UE 3 |
|---|---|---|---|

(a)

| Msg2 for A-UE 2 | Msg2 for L-UE 1 | Msg8 for A-UE 1 | Msg8 for A-UE 3 |
|---|---|---|---|

(b)

METHOD AND DEVICE FOR TRANSMITTING/RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2019/010164, filed on Aug. 9, 2019, which claims the benefit of U.S. Provisional Application No. 62/716,956, filed on Aug. 9, 2018. The disclosures of the prior applications are incorporated by reference in their entirety.

TECHNICAL FIELD

The present disclosure relates to a method and apparatus for use in a wireless communication system. More particularly, the present disclosure relates to a method and apparatus for transmitting/receiving a signal related to a random access.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE DISCLOSURE

Technical Problems

An object of the present disclosure is to provide a method of efficiently performing a random access procedure in a wireless communication and an apparatus therefor.

Technical tasks obtainable from the present disclosure are non-limited the above-mentioned technical task. And, other unmentioned technical tasks can be clearly understood from the following description by those having ordinary skill in the technical field to which the present disclosure pertains.

Technical Solutions

The present disclosure provides a method and apparatus for receiving signals in a wireless communication system.

According to an aspect of the present disclosure, provided herein is a method of transmitting and receiving a signal by a communication apparatus in a wireless communication system, including transmitting a message A corresponding to a 2-step random access procedure or a message 1 corresponding to a 4-step random access procedure, the message A including a first physical random access channel (PRACH) and a physical uplink shared channel (PUSCH) part, and the message 1 including a second PRACH; and receiving a physical downlink shared channel (PDSCH) including a message B corresponding to the message A or a message 2 corresponding to the message 1, wherein a random access channel occasion (RO) for transmission of the first PRACH and an RO for transmission of the second PRACH are differently configured.

According to another aspect of the present disclosure, provided herein is a method of transmitting and receiving a signal by a communication apparatus in a wireless communication system, including transmitting a message A corresponding to a 2-step random access procedure or a message 1 corresponding to a 4-step random access procedure, the message A including a first physical random access channel (PRACH) and a physical uplink shared channel (PUSCH) part, and the message 1 including a second PRACH; and receiving a physical downlink shared channel (PDSCH) including a message B corresponding to the message A or a message 2 corresponding to the message 1, wherein a random access channel occasion (RO) for transmission of the first PRACH and an RO for transmission of the second PRACH are shared, and a preamble index (PI) of the first PRACH and a PI of the second PRACH are differently configured.

According to another aspect of the present disclosure, provided herein is a communication apparatus for transmitting and receiving a signal in a wireless communication system, including at least one transceiver; at least one processor; and at least one memory operably connected to the at least one processor and configured to store instructions for causing the at least one processor to perform a specific operation based on execution of the at least one processor, wherein the specific operation includes transmitting a message A corresponding to a 2-step random access procedure or a message 1 corresponding to a 4-step random access procedure, the message A including a first physical random access channel (PRACH) and a physical uplink shared channel (PUSCH) part, and the message 1 including a second PRACH, and receiving a physical downlink shared channel (PDSCH) including a message B corresponding to the message A or a message 2 corresponding to the message 1, and wherein a random access channel occasion (RO) for transmission of the first PRACH and an RO for transmission of the second PRACH are differently configured.

According to another aspect of the present disclosure, provided herein is a communication apparatus for transmitting and receiving a signal in a wireless communication system, including at least one transceiver; at least one processor; and at least one memory operably connected to the at least one processor and configured to store instructions for causing the at least one processor to perform a specific operation based on execution of the at least one processor, wherein the specific operation includes transmitting a message A corresponding to a 2-step random access procedure or a message 1 corresponding to a 4-step random access procedure, the message A including a first physical random access channel (PRACH) and a physical uplink shared channel (PUSCH) part, and the message 1 including a second PRACH, and receiving a physical downlink shared channel (PDSCH) including a message B corresponding to the message A or a message 2 corresponding to the message 1, and wherein a random access channel occasion (RO) for transmission of the first PRACH and an RO for transmission of the second PRACH are shared, and a preamble index (PI) of the first PRACH and a PI of the second PRACH are differently configured.

In the method or the apparatus, the PUSCH part may be defined by a PUSCH occasion (PO) for transmission of the PUSCH part and by a demodulation reference signal (DMRS) sequence.

In the method or the apparatus, the PUSCH part may be scrambled based on a scrambling identity (SCID) associated with a radio network temporary identifier (RNTI) and a preamble index (PI).

In the method or the apparatus, the RO for transmission of the first PRACH may be related to one PUSCH occasion (PO) or plural POs for transmission of the PUSCH part.

In the method or the apparatus, a radio network temporary identifier (RNTI) included in a physical downlink control channel (PDCCH) scheduling the PDSCH may be associated with the RO for transmission of the first PRACH.

In the method or the apparatus, the message B may include an identity (ID) for contention resolution, a cell-radio network temporary identifier (C-RNTI), and a timing advance (TA) command.

In the method or the apparatus, HARQ-ACK (hybrid automatic repeat request-acknowledgement (HARQ-ACK)) information for the message B may be transmitted to a network. The message B may further include resource allocation information for the HARQ-ACK information, and the HARQ-ACK information may be transmitted based on the resource allocation information and the TA command.

In the method or the apparatus, which one of the message A and the message 1 is transmitted may be determined based on a transport block size (TBS) of a transport block to be transmitted by the communication apparatus and/or transmit power necessary for transmission of the transport block.

In the method or the apparatus, the message A and the message 1 may be transmitted in an unlicensed band, and the message B and the message 2 may be received in the unlicensed band.

In the method or the apparatus, the PDSCH may include a plurality of messages B and a plurality of messages 2 for other communication apparatuses, wherein the plural messages 2 may be mapped to lower bit indexes than the plural messages B in the PDSCH. The PDSCH may include the plural messages B or the plural messages 2, and wherein the plural messages B or the plural messages 2 may be indicated by a flag included in a PDCCH scheduling the PDSCH. The PDSCH may include the plural messages B or the plural messages 2, wherein a DCI payload size of the PDCCH that schedules the PDSCH including the plural messages B and a DCI payload size of the PDCCH that schedules the PDSCH including the plural messages 2 may be differently configured.

The apparatus may include a self-driving vehicle communicable with at least one of a user equipment, a network, or another self-driving vehicle other than the communication apparatus.

The above-described aspects of the present disclosure are merely some parts of exemplary embodiments of the present disclosure and various embodiments into which technical features of the present disclosure are incorporated may be derived and understood by persons skilled in the art from the following detailed description of the present disclosure.

Advantageous Effects

According to an embodiment of the present disclosure, a more efficient random access procedure may be performed through an operation differentiated from the prior art when a communication apparatus performs a random access procedure.

Effects obtainable from the present disclosure may be non-limited by the above mentioned effect. And, other unmentioned effects can be clearly understood from the following description by those having ordinary skill in the technical field to which the present disclosure pertains.

BRIEF DESCRIPTION OF DRAWINGS

FIGS. 9 to 13 illustrate random access procedures according to an embodiment of the present disclosure.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A)/LTE-A pro is an evolved version of 3GPP LTE. 3GPP NR (New Radio or New Radio Access Technology) is an evolved version of 3GPP LTE/LTE-A/LTE-A pro.

For the sake of clarity, 3GPP communication system (e.g., LTE, NR) is mainly described, but the technical idea of the present disclosure is not limited thereto. LTE refers to techniques as of 3GPP TS 36.xxx Release 8. More particularly, LTE techniques as of 3GPP TS 36.xxx Release 10 are referred to as LTE-A, and LTE techniques as of 3GPP TS 36.xxx Release 13 are referred to as LTE-A pro. 3GPP NR represents techniques as of TS 38.xxx Release 15. LTE/NR can be referred to as 3GPP system. "xxx" represents a detailed reference numbers of standard documents. LTE/NR can be collectively referred to as 3GPP system. Background, terms, abbreviations, etc. used in the explanation of the present disclosure can be referred to the standard documents published before the present disclosure. For example, the following documents can be referred.

Figure 1:
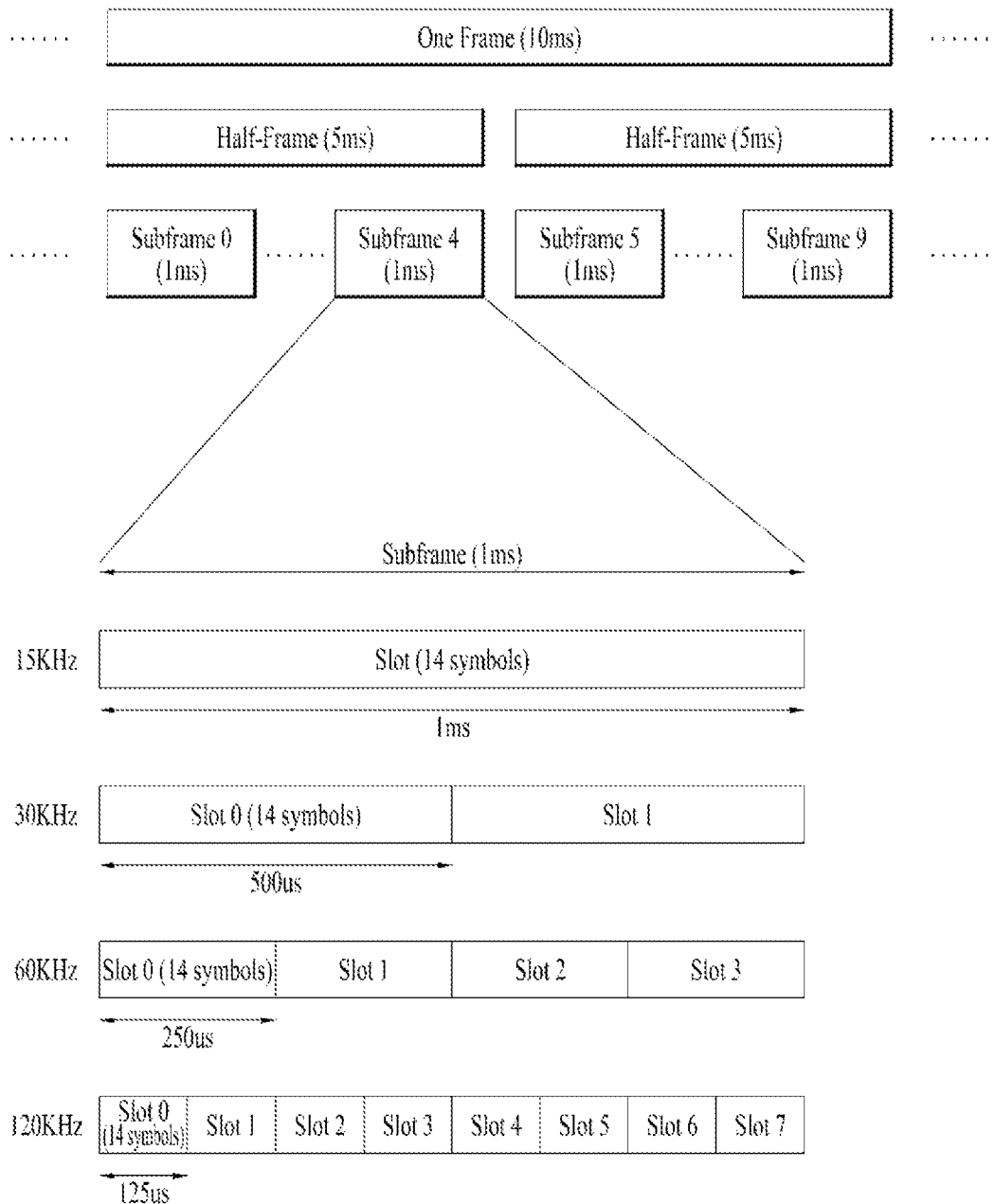
FIG. 1 illustrates a radio frame structure.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used in NR.

In NR, uplink (UL) and downlink (DL) transmissions are configured with frames. A radio frame has a length of 10 ms and is defined as two 5-ms half-frames (HF). A half-frame is defined as five 1-ms subframes (SFs). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, a symbol may include OFDM symbol (or, CP-OFDM symbol), SC-FDMA symbol (or, DFT-s-OFDM symbol).

Table 1 exemplarily shows that the number of symbols per slot, the number of slots per frame, and the number of slots per subframe vary according to the SCS when the normal CP is used.

TABLE 1

| SCS (15*2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: Number of symbols in a slot
*$N_{slot}^{frame,u}$: Number of slots in a frame
*$N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, OFDM(A) numerology (e.g., SCS, CP length, etc.) may be set differently between a plurality of cells that are aggregated with respect to one user equipment (UE) Accordingly, the (absolute time) duration of a time resource (e.g., SF, slot or TTI) (for convenience, collectively referred to as TU (Time Unit)) composed of the same number of symbols may be set differently between the aggregated cells.

Figure 2:
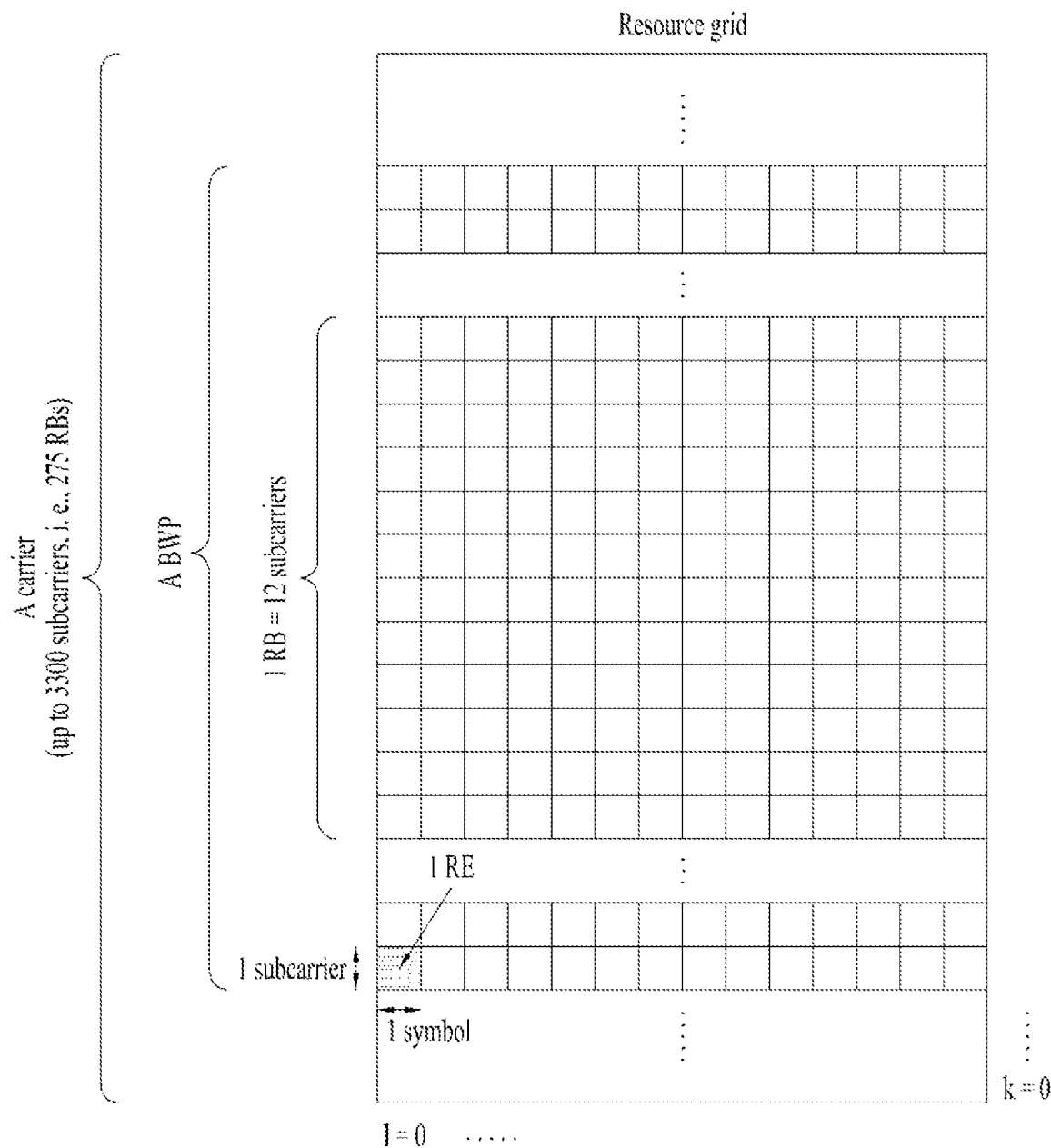
FIG. 2 illustrates a resource grid of a slot.

FIG. 2 illustrates a slot structure in a NR frame.

A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 3:
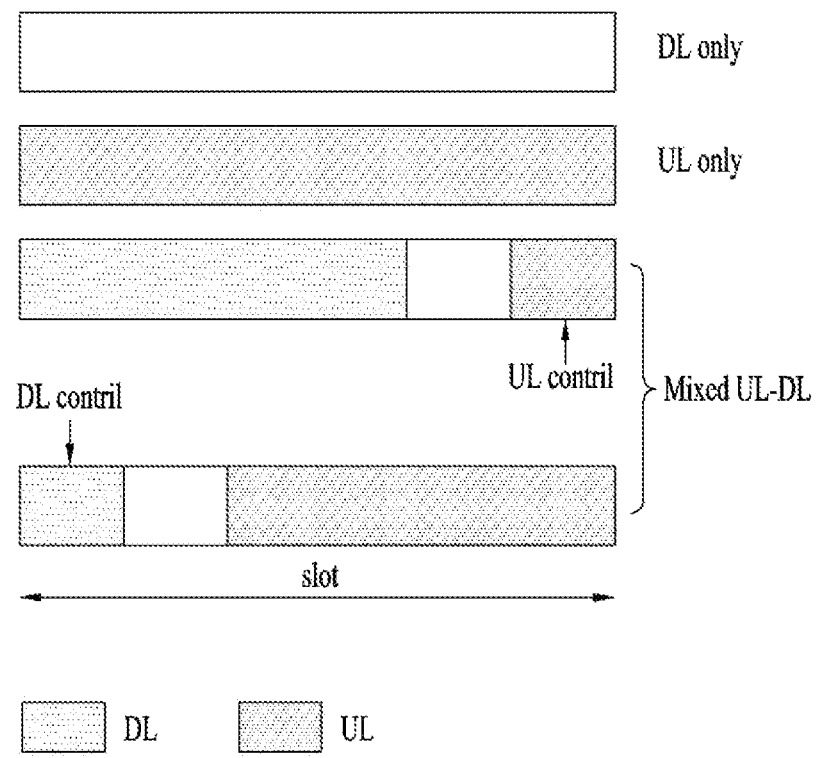
FIG. 3 illustrates a structure of a self-contained slot.

FIG. 3 illustrates a structure of a self-contained slot.

In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. For example, the following configurations may be considered. Corresponding intervals are listed in temporal order.

1. DL only configuration
2. UL only configuration
3. Mixed UL-DL configuration
   DL region+Guard Period (GP)+UL control region;
   DL control region+GP+UL region,
   DL region: (i) DL data region or (ii) DL control region+
      DL data region;
   UL region: (i) UL data region or (ii) UL data region+UL
      control region.

A physical downlink control channel (PDCCH) may be transmitted in the DL control region, and a physical downlink shared channel (PDSCH) may be transmitted in the DL data region. A physical uplink control channel (PUCCH) may be transmitted in the UL control region, and a PUSCH may be transmitted in the UL data region. On the PDCCH, downlink control information (DCI), for example, DL data scheduling information, UL data scheduling information, and the like may be transmitted. In the PUCCH, uplink control information (UCI), for example, positive acknowledgment/negative acknowledgment (ACK/NACK) information for DL data, channel state information (CSI) information, scheduling request (SR), and the like may be transmitted. The GP provides a time gap in the process of switching from the transmission mode to the reception mode or from the reception mode to the transmission mode. Some symbols at the time of switching from DL to UL within a subframe may be configured as the GP.

In the present disclosure, a base station may be for example gNodeB.

1. Wireless Communication System Supporting Unlicensed Band

Figure 4:
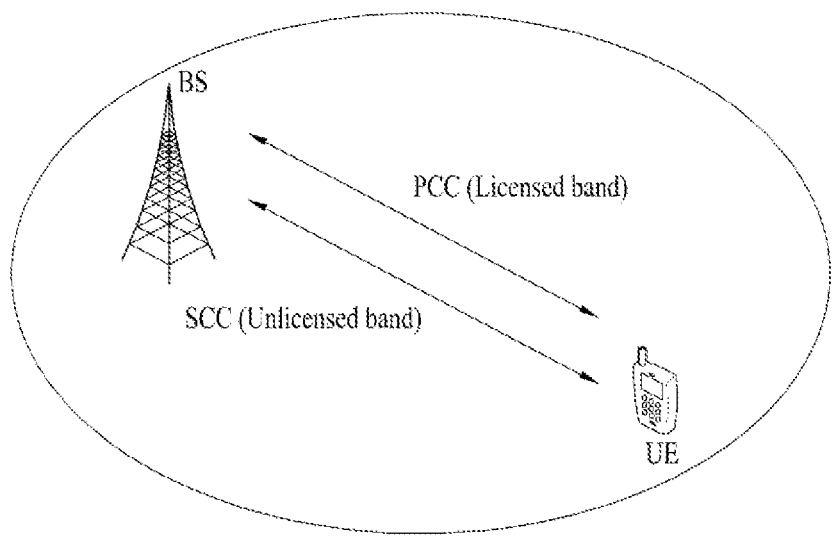
FIG. 4 illustrates a wireless communication system supporting an unlicensed band.
Figure 4:
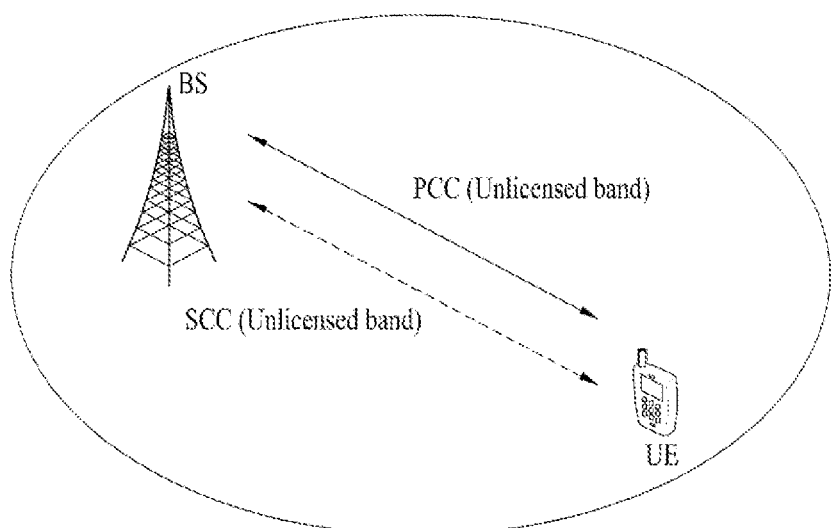

FIG. 4 is a diagram illustrating an exemplary wireless communication system supporting an unlicensed band.

In the following description, a cell operating in a licensed band (L-band) is defined as an L-cell, and a carrier of the L-cell is defined as a (DL/UL) licensed component carrier (LCC). Further, a cell operating in an unlicensed band (U-band) is defined as a U-cell, and a carrier of the U-cell is defined as a (DL/UL) unlicensed component carrier (UCC). The carrier/carrier-frequency of a cell may refer to the operating frequency (e.g., center frequency) of the cell. A cell/carrier (e.g., CC) is generically referred to as a cell.

When a UE and a BS transmit and receive signals to and from each other in a carrier-aggregated LCC and UCC, the LCC may be configured as a primary CC (PCC), and the UCC may be configured as a secondary CC (SCC), as illustrated in FIG. 4(a). As illustrated in FIG. 4(b), the UE and the BS may transmit and receive signals to and from each other in one UCC or a plurality of carrier-aggregated UCCs. That is, the UE and the BS may transmit and receive signals only in UCC(s) without an LCC.

Hereinafter, a signal transmission and reception operation in an unlicensed band as described in the present disclosure may be performed based on all of the above-described deployment scenarios.

Radio Frame Structure for Unlicensed Band

For an operation in an unlicensed band, an NR frame structure (see FIG. 1) may be used. The configuration of OFDM symbols occupied by a UL/DL signal transmission in a frame structure for the unlicensed band may be configured by the BS. Herein, the term OFDM symbol may be replaced with SC-FDM(A) symbol.

Meanwhile, in the following, a plurality of CCs (index) may be replaced with a plurality of BWPs (index) configured in one (or more) CC or (serving) cells, or a plurality of CCs/cells composed of a plurality of BWPs (i.e., a combination of CC (index) and BWP (index)), and in such a state, the proposed principle/operation of the present disclosure can be applied in a same way.

Figure 5:
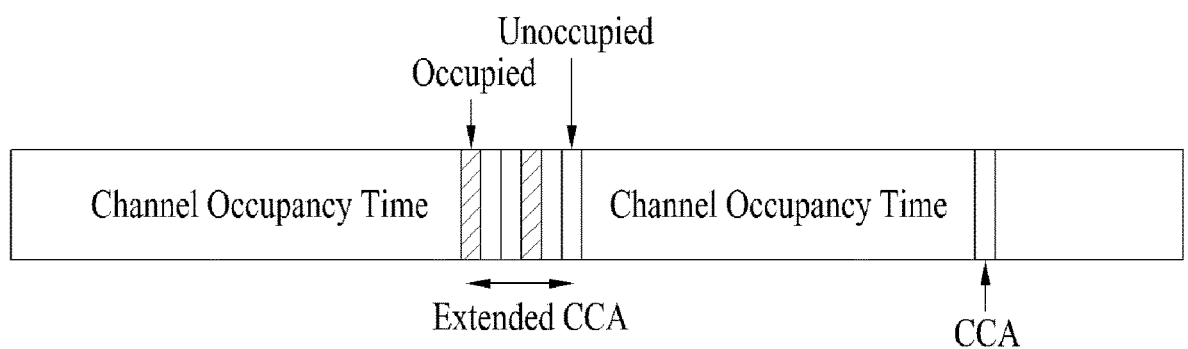
FIG. 5 illustrates a method of occupying resources in an unlicensed band.

FIG. 5 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the U-cell). The above processes may be referred to as listen-before-talk (LBT) or a channel access procedure (CAP). LBT and CAP may be used interchangeably.

Specifically, for DL reception/UL transmission in the U-band, one or more of CAP methods to be described hereinbelow may be used in a wireless communication system related to the present disclosure.

Method of Transmitting DL Signal in Unlicensed Band

In order to transmit a downlink signal through an unlicensed band, the BS may inform the UE of the configuration of OFDM symbols used in a specific time unit through signaling. Here, the specific time resource unit may be, for example, a subframe or a slot.

For a DL signal transmission in an unlicensed band, the BS may perform one of the following unlicensed band access procedure (e.g., channel access procedure (CAP)).

(1) First DL CAP Method

Figure 6:
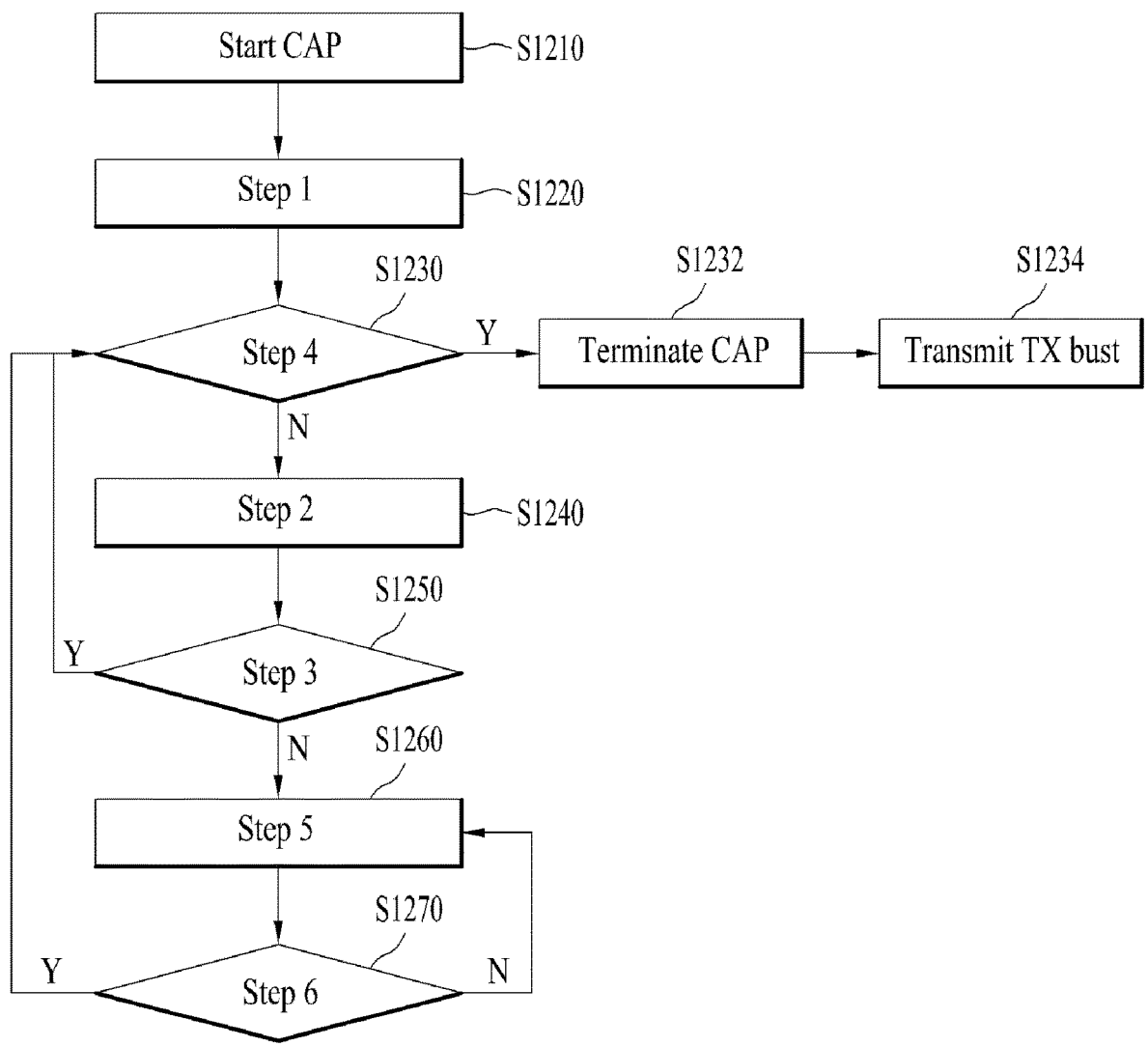
FIGS. 6 and 7 are flowcharts illustrating a channel access procedure (CAP) operation for transmitting a signal in an unlicensed band.

FIG. 6 is a flowchart illustrating a CAP operation for transmitting a DL signal in an unlicensed band by a BS.

For a DL signal transmission (e.g., a signal transmission including a downlink control channel and/or a downlink data channel), a BS may initiate a CAP (S1210). ABS may initiate a CAP (S1210). The BS may randomly select a backoff counter N within a contention window (CW) according to step 1. N is set to an initial value $N_{init}$ (S1220). $N_{init}$ is a random value selected between 0 and $CW_p$. Subsequently, when the backoff counter value N is 0 according to step 4 (S1230; Y), the BS terminates the CAP (S1232). The BS may then perform a Tx burst transmission including a downlink control channel and/or downlink data channel (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy in operation (S1250; N), the BS determines whether the channel is idle during a longer defer duration Td (25 μsec or longer) than a sensing slot duration (e.g., 9 μsec) (S1260). If the channel is idle during the defer duration (S1270; Y), the BS may resume the CAP. The defer duration may be made up of a 16-μsec period and the following $m_p$ consecutive slot durations (e.g., 9 μsec). On the other hand, when the channel is busy during the defer duration (S1270; N), the BS determines again whether the channel of the U-cell(s) is idle during a new defer duration by performing step S1260 again.

Table 3 illustrates that $m_p$, a minimum CW, a maximum channel occupancy time (MCOT), and an allowed CW size, which are applied to a CAP vary according to a channel access priority class.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A contention window size applied to the first DL CAP may be determined in various methods. For example, the contention window size may be adjusted based on the probability of hybrid automatic repeat request-acknowledgement (HARQ-ACK) values corresponding to PDSCH transmission(s) for a predetermined time period (e.g., reference TU) being determined as NACK. When the BS performs a DL signal transmission including a PDSCH related to a channel access priority class p on a carrier, if the probability of HARQ-ACK values corresponding to PDSCH transmission(s) in reference subframe k (or reference slot k) being determined as NACK is at least 80% (Z=80%), the BS increases a CW value set for each priority class to the next higher allowed value. Alternatively, the BS maintains the CW value set for each priority class to be an initial value. The reference subframe (or reference slot) may be defined as the starting subframe of the most recent transmission on the channel made by the BS, for which at least some HARQ-ACK feedback is expected to be available.

(2) Second DL CAP Method

The BS may perform a DL signal transmission (e.g., including a discovery signal transmission and not including a PDSCH) in an unlicensed band based on a later-described second DL CAP method.

If the signal transmission duration of the BS is equal to or less than 1 ms, the BS may perform a DL transmission (e.g., including a discovery signal transmission and not including a PDSCH) immediately after sensing the channel to be idle for at least a sensing duration $T_{drs}$=25 μs. $T_{drs}$ include a duration $T_f$ (=16 μs) following one sensing slot duration $T_{sl}$=9 μs.

(3) Third DL CAP Method

The BS may perform the following CAPs for DL signal transmission on multiple carriers in an unlicensed band.

1) Type A: The BS performs a CAP for multiple carriers based on a counter N (a counter N considered in a CAP) defined for each carrier and performs a DL signal transmits based on the CAP.

Type A1: The counter N is independently determined for each carrier, and a DL signal transmission is performed on each carrier based on the counter N for the carrier.

Type A2: The counter N for each carrier is determined to be an N value for a carrier with a largest contention window size, and a DL signal transmission is performed on each carrier based on the counter N for the carrier.

2) Type B: The BS performs a CAP for only a specific carrier among a plurality of carriers based on a counter N, determines whether the channel is idle on the other carriers before a signal transmission on the specific carrier, and then performs a DL signal transmission.

Type B1: A single contention window size is defined for a plurality of carriers, and the BS uses the single contention window size in a CAP based on a counter N for a specific carrier.

Type B2: A contention window size is defined for each carrier, and the largest of contention window sizes is used in determining Ninit for a specific carrier.

Method of Transmitting UL Signal in Unlicensed Band

In order to transmit an uplink signal through an unlicensed band, the BS may inform the UE of information on the uplink transmission duration through signaling.

The UE performs a contention-based CAP to transmit a UL signal in an unlicensed band. The UE performs a Type 1 or Type 2 CAP to transmit a UL signal in the unlicensed band. In general, the UE may perform a CAP (e.g., Type 1 or Type 2) configured by the BS to transmit a UL signal.

(1) Type 1 UL CAP Method

Figure 7:
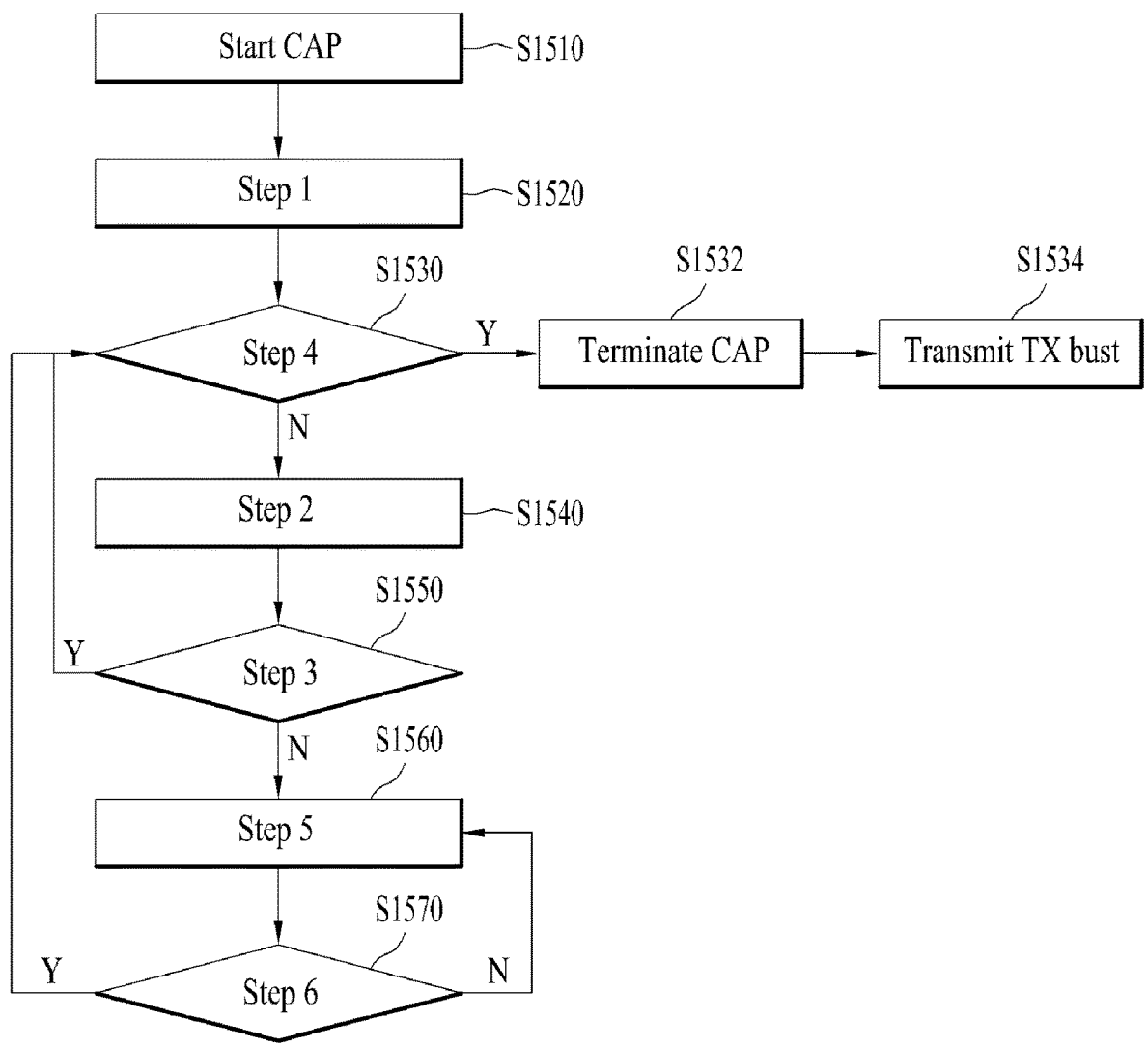

FIG. 7 is a flowchart a Type 1 CAP operation of a UE, for UL signal transmission.

For a signal transmission in an unlicensed band, a UE may initiate a CAP (S1510). The UE may select a backoff counter N randomly within a CW according to step 1. N is set to an initial value $N_{init}$ (S1520). $N_{init}$ is a value randomly selected between 0 and $CW_p$. Subsequently, when the backoff counter value N is 0 according to step 4 (S1530; Y), the UE ends the CAP (S1532). The UE may then transmit a Tx burst (S1534). On the other hand, if the backoff counter value is not 0 (S1530; N), the UE decrements the backoff counter value by 1 according to step 2 (S1540). Subsequently, the UE checks whether a channel of U-cell(s) is idle (S1550). If the channel is idle (S1550; Y), the UE checks whether the backoff counter value is 0 (S1530). On the contrary, if the channel is not idle, that is, the channel is busy (S1550; N), the UE checks whether the channel is idle for a defer duration Td (of 25 μsec or more) longer than a slot duration (e.g., 9 μsec) according to step 5 (S1560). If the channel is idle for the defer duration (S1570; Y), the UE may resume the CAP. The defer duration may be made up of a 16-μsec duration and the following $m_p$ consecutive slot durations (e.g., 9 μsec). On the other hand, if the channel is busy for the defer duration (S1570; N), the UE checks again whether the channel is idle for a new defer duration by performing operation S1560 again.

Table 4 illustrates that $m_p$, a minimum CW, a Maximum Channel Occupancy Time (MCOT), and an allowed CW size, which are applied to a CAP vary according to a channel access priority class.

TABLE 4

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

A contention window size applied to the Type 1 UL CAP may be determined based on various methods. For example, the contention window size may be adjusted based on whether a new data indicator (NDI) value for at least one HARQ process related to an HARQ process ID of a UL-SCH, HARQ_ID_ref within a predetermined time period (e.g., reference TU) is toggled. When the UE performs a signal transmission using the Type 1 CAP related to a channel access priority class p on a carrier, if the NDI value for at least one HARQ process associated with HARQ_I-D_ref is toggled, the UE sets $CW_p$=C for every priority class p∈{1, 2, 3, 4}. Otherwise, the UE increases $CW_p$ for every priority class p∈{1, 2, 3, 4} to the next higher allowed value.

The reference subframe $n_{ref}$ (or reference slot $n_{ref}$) is determined as follows.

If the UE receives a UL grant in subframe (or slot) $n_g$ and performs transmissions including a UL-SCH without gaps starting with subframe (or slot) no and in subframes (or slots) $n_0$, $n_1$, . . . , $n_w$ (subframe $n_w$ is the most recent subframe before subframe $n_g$−3 in which the UE has transmitted a UL-SCH using the Type 1 CAP), reference subframe (or slot) $n_{ref}$ is subframe (or slot) no.

(2) Type 2 UL CAP Method

If the UE uses the Type 2A UL CAP to transmit a UL signal (e.g., a signal including a PUSCH), the UE may transmit the UL signal (e.g., the signal including the PUSCH) in the unlicensed band immediately after sensing the channel to be idle for at least a sensing duration $T_{short\_ul}$=25 us. $T_{short\_ul}$ includes a duration $T_f$=16 us immediately followed by one slot sensing slot duration $T_{sl}$=9 us $T_f$ includes a sensing slot at the start of $T_f$.

2. Random Access (RA) Procedure

General Procedure

Next, an RA procedure will be described. The RA procedure is also referred to as a random access channel (RACH) procedure. The RA procedure is variously used for initial access, UL synchronization adjustment, resource allocation, handover, radio link reestablishment after radio link failure, and location measurement. The RA procedure is classified into a contention-based procedure and a dedicated (i.e., non-contention-based) procedure. The contention-based RA procedure is generally used for initial access, and the dedicated RA procedure is limitedly used for handover, arrival of DL data, and UL synchronization reestablishment during location measurement. In the contention-based RA procedure, the UE randomly selects an RACH preamble sequence. Accordingly, a plurality of UEs may simultaneously transmit the same RACH preamble sequence and, thus, a subsequent contention resolution procedure is required. In contrast, in the dedicated RA procedure, the UE uniquely uses the RACH preamble sequence allocated thereto by the BS. Therefore, the RA procedure may be performed without collision with other UEs.

Figure 8:
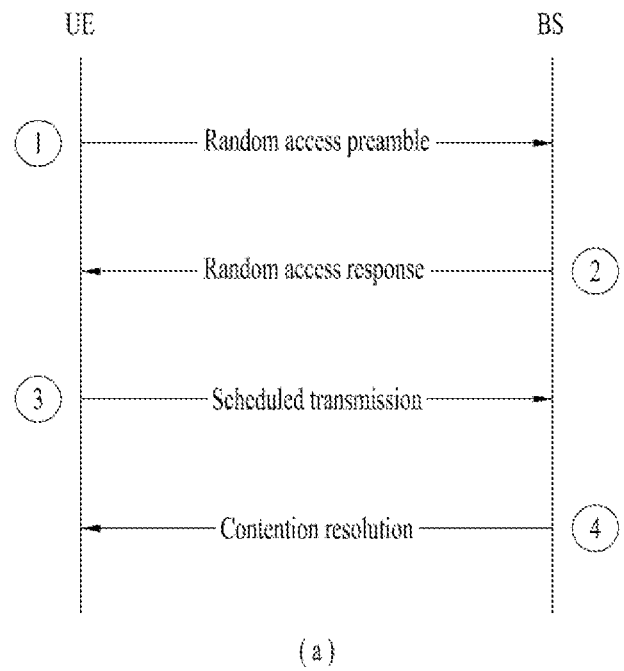
FIG. 8 illustrates a general random access procedure.
Figure 8:
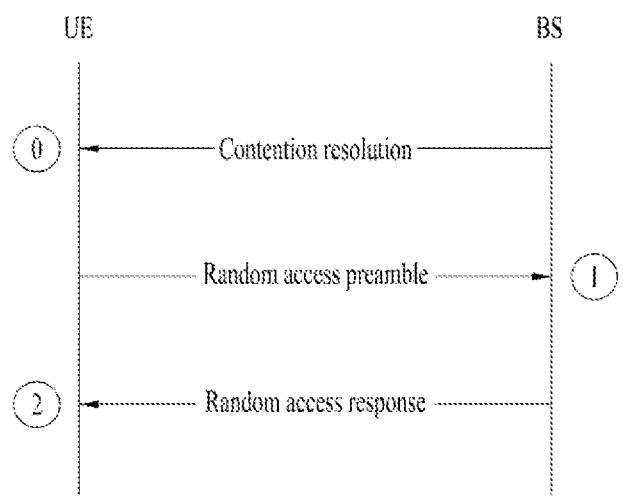

FIG. 8 illustrates an RA procedure. FIG. 8(a) illustrates a contention-based RA procedure, and FIG. 8(b) illustrates a dedicated RA procedure.

Referring to FIG. 8(a), the contention-based RA procedure includes the following four steps. Hereinafter, messages transmitted in Steps 1 to 4 may be referred to as Msg1 to Msg4, respectively.

Step 1: A UE transmits an RA preamble through a physical random access channel (PRACH).
Step 2: The UE receives a random access response (RAR) from a BS through a DL-shared channel (SCH).
Step 3: The UE transmits a Layer 2/Layer 3 message to the BS through a UL-SCH.
Step 4: The UE receives a contention resolution message from the BS through the DL-SCH.

The UE may receive information about RA from the BS through system information.

When RA is required, the UE transmits the RA preamble to the BS as in Step 1. The BS may distinguish RA preambles by time/frequency resources on which the RA preambles are transmitted (RACH occasions ROs) and by RA preamble indexes (PIs).

Upon receiving the RA preamble from the UE, the BS transmits the RAR message to the UE as in Step 2. To receive the RAR message, the UE monitors an L1/L2 control channel (PDCCH), which is CRC-masked with an RA-radio network temporary identifier (RNTI), including scheduling information for the RAR message, in a preset time window (e.g., ra-ResponseWindow). The PDCCH masked with the RA-RNTI may be transmitted only through a common search space. Upon receiving a scheduling signal masked with the RA-RNTI, the UE may receive the RAR message through a PDSCH indicated by the scheduling information. Next, the UE checks whether there is RAR information indicated thereto in the RAR message. Whether there is RAR information indicated to the UE may be checked by confirming whether a random access preamble ID (RAPID) for the preamble transmitted by the UE is present. An index of the preamble transmitted by the UE may be equal to the RAPID. The RAR information includes a corresponding RA preamble index, timing offset information (e.g., a timing advance command (TAC) for UL synchronization, UL scheduling information (e.g., UL grant) for Msg3 transmission, and UE temporary ID information (e.g., temporary cell RNTI (TC-RNTI)).

Upon receiving the RAR information, the UE transmits UL-SCH data (Msg3) through a PUSCH according to the UL scheduling information and a timing offset value, as in Step 3. Msg3 may include an ID of the UE (or a global ID of the UE). Alternatively, Msg3 may include RRC connection request related information (e.g., RRCSetupRequest message) for initial access. In addition, Msg3 may include a buffer state report (BSR) on the amount of data available for transmission by the UE.

After receiving the UL-SCH data, the BS transmits the contention resolution message (Msg4) to the UE as in Step 4. When the UE receives the contention resolution message and succeeds in contention resolution, the TC-RNTI is changed to a C-RNTI. Msg4 may include the ID of the UE and/or RRC connection related information (e.g., RRC Setup message). If information transmitted through Msg3 is not equal to information transmitted through Msg4 or the UE has failed to receive Msg4 for a predetermined time, the UE may determine that contention resolution has failed and retransmit Msg3.

Referring to FIG. 8(b), the dedicated RA procedure includes the following three steps. Hereinafter, messages transmitted in steps 0 to 2 will be referred to as Msg0 to Msg2. The dedicated RA procedure may be triggered using a PDCCH used by the BS to command the UE to transmit an RACH preamble (hereinafter, PDCCH order).

Step 0: The BS allocates the RACH preamble to the UE through dedicated signaling.
Step 1: The UE transmits the RACH preamble through a physical random access channel (PRACH).
Step 2: The UE receives an RAR from the BS through a DL-SCH.
Steps 1 and 2 of the dedicated RA procedure may be the same as Steps 1 and 2 of the contention-based RA procedure.

In NR, in order to initiate the non-contention-based RA procedure through a PDCCH order, DCI format 1_0 is used. DCI format 1_0 is used to schedule the PDSCH in one DL cell. When a cyclic redundancy check (CRC) of DCI format 1_0 is scrambled with the C-RNTI and all bit values of a "Frequency domain resource assignment" field are 1, DCI format 1_0 is used as the PDCCH order indicating the RA procedure. In this case, a field of DCI format 1_0 is configured as follows RA preamble index: 6 bits
UL/supplementary UL (SUL) indicator: 1 bit. In the case in which bit values of the RA preamble index are not all 0 and in the case in which SUL is configured in a cell for the UE, the UL/SUL indicator indicates a UL carrier in which the PRACH is transmitted. For the other cases, the UL/SUL indicator is reserved.
Synchronization signal/physical broadcast channel (PBCH) block (SSB) index: 6 bits. When bit values of the RA preamble index are not all 0, the SSB index indicates an SSB used to determine an RO for PRACH transmission. For the other cases, the SSB index is reserved.
PRACH mask index: 4 bits. When bit values of the RA preamble index are not all 0, the PRACH mask index indicates an RO associated with an SSB indicated by the SSB index. For the other cases, the SSB index is reserved.
Reserved: 10 bits When DCI format 1_0 does not correspond to the PDCCH order, DCI format 1_0 consists of a field used to schedule the PDSCH (e.g., time domain resource assignment, a modulation and coding scheme (MCS), a HARQ process number, a PDSCH-to-HARQ_feedback timing indicator, etc.).

2-Step RA Procedure

As described above, the conventional rando access procedure includes the 4-step procedure. In a legacy LTE system, an average of 15.5 ms is consumed for the 4-step RA procedure as shown in Table 5.

TABLE 5

| Component | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than the legacy system. If the RA procedure is present in a U-band, only when the UE and the BS sequentially succeed in LBT in all steps of the 4-step RA procedure, the RA procedure is ended and contention is resolved. If LBT has failed even in one step of the 4-step RA procedure, resource efficiency is deteriorated and latency increases. In particular, when LBT has failed in a scheduling/transmission process associated with Msg2 or Msg3, resource efficacy may be greatly reduced and latency may remarkably increase. Even the RA procedure in an L-band may require low latency in various scenarios of the NR system. Therefore, the 2-step RA procedure may be performed even in the L-band.

To reduce latency in the RA procedure, the present disclosure proposes the 2-step RA procedure.

As illustrated in FIG. 9(a), the proposed RA procedure may include two steps of UL signal (referred to as MsgA) transmission from the UE to the BS and DL signal (referred to as MsgB) transmission from the BS to the UE.

While a description given hereinbelow is focused on an initial access procedure, the proposed method may also be equally applied to an RA procedure after RRC connection is established between the UE and the BS. Further, an RA preamble and a PUSCH part may also be transmitted together even in the non-contention-based RA procedure as illustrated in FIG. 9(b).

Although not illustrated, a PDCCH for scheduling MsgB may be transmitted by the BS to the UE and may be referred to as a MsgB PDCCH.

Transmission Format and Parameter Configuration of MsgA

Figure 9:
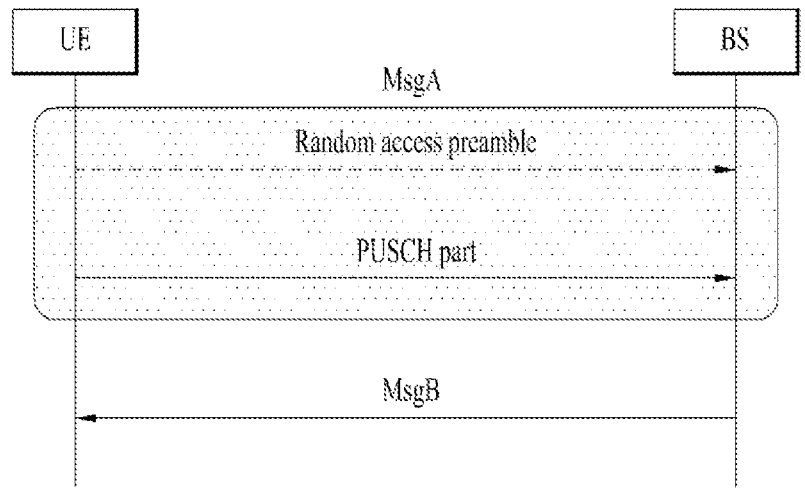
Figure 9:
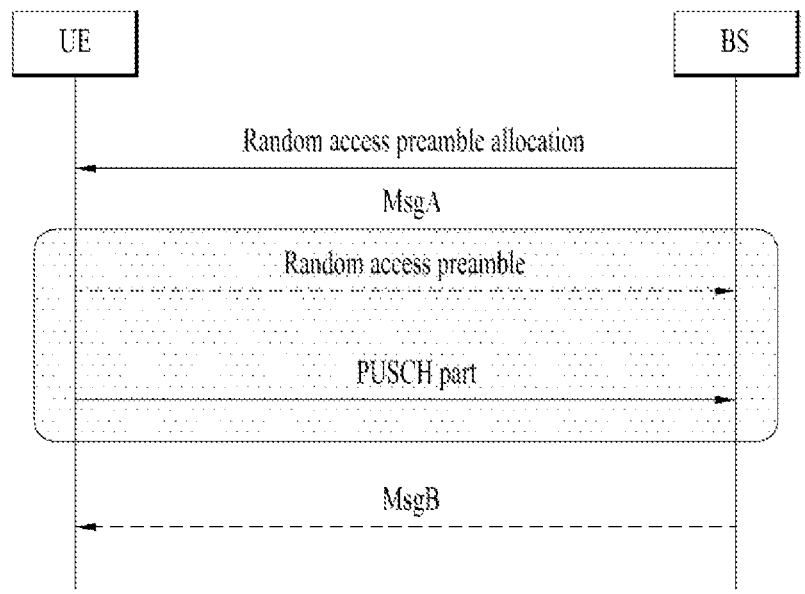

MsgA for the 2-step RA procedure may be configured in a combination of an RA preamble and a PUSCH as illustrated in FIG. 9. The RA preamble and the PUSCH part may be combined in the form of time-division multiplexing (TDM) or frequency-division multiplexing (FDM).

Parameters related to MsgA are as follows.

(1) RA Preamble

RO: RO represents time and frequency resources on which an RA preamble signal may be transmitted.

PI: PI represents an index of the RA preamble that may be distinguished by a sequence with respect to one RO.

(2) PUSCH Part

Scrambling ID (SCID): SCID is a seed ID used for scrambling of the PUSCH part including UL data related to an RA procedure.

Demodulation RS (DMRS): DMRS is an RS used to estimate a channel for demodulation of the PUSCH part. Each DMRS may be identified by a sequence, a cyclic shift (CS), an RE mapping pattern/location, an orthogonal cover code (OCC), an antenna port (a DMRS port), and/or an SCID. The PUSCH part may be distinguished by the DMRS but may be distinguished by one or more of elements for identifying the DMRS.

UL resource (ULRA): ULRA represents time and frequency resources used to transmit the PUSCH part. ULRA may be expressed as a PUSCH occasion (PO).

One MsgA signal (and/or index) may be configured by combining the RA preamble distinguished based on a specific combination of {RO, PI} and the PUSCH part distinguished based on a specific combination of {SCID and DMRS, ULRA}. The expression "transmitting the RA preamble" may be replaced with "transmitting a PRACH". The expression "transmitting the PUSCH part of MsgA" may be replaced with "transmitting a payload of MsgA" or "transmitting a PUSCH of MsgA".

The RA preamble and the PUSCH part may be distinguished by some of the parameters. For example, the RA preamble in MsgA may be distinguished by one of the RO and the PI. As another example, the PUSCH part in MsgA may be distinguished by a combination of {DMRS, ULRA}. Since the DMRS may be distinguished by, for example, a DMRS sequence, the PUSCH part may be distinguished by a combination of {DMRS sequence, ULRA}.

Hereinbelow, the expression "the RA preamble or the PUSCH part are distinguished by any combination" may be replaced with "the RA preamble or the PUSCH part are defined by any combination".

MsgA may be configured as follows.

First, a time/frequency resource on which an RA preamble is transmitted may be mapped to a time/frequency resource on which the PUSCH part is transmitted in one-to-one correspondence by mapping one ULRA to one RO. That is, if an RO in which the RA preamble is to be transmitted is determined, a ULRA on which the PUSCH part is to be transmitted is determined. One combination of {RO, ULRA} may be associated with a plurality of PIs. One PI may correspond to one combination of the SCID and the DMRS. Alternatively, the combination of the SCID and the DMRS may be derived by a function having the PI as an input value. One PI may also be associated with a plurality of combinations of the SCID and the DMRS. In this case, MsgB (or a PDSCH including MsgB) includes information about which one of the plurality combinations of the SCID and the DMRS associated with one PI is the basis for a response to the PUSCH part.

Alternatively, one RO may correspond to a plurality of ULRAs. Specifically, one RO may be associated with a plurality of PI groups. Each PI group may correspond to a ULRA consisting of different frequency resources. Consequently, one RO may correspond to a plurality of ULRAs. The ULRA may be derived by a function having a specific PI as an input value in a PI group. In one combination of {PI group, ULRA}, a specific PI in the PI group may correspond to one combination of the SCID and the DMRS. Alternatively, the combination of the SCID and DMRS may be derived by a function having a specific PI in the PI group as an input value. The specific PI in the PI group may be associated with a plurality of combinations of the SCID and the DMRS. In this case, MsgB (or a PDSCH including MsgB) includes information about which one of the plurality of combinations of the SCID and the DMRS associated with the specific PI is the basis for a response to the PUSCH part.

In the above embodiments, one PI may correspond to a plurality of combinations of {SCID and DMRS, ULRA}. In this case, MsgB (or a PDSCH including MsgB) includes information about which one of the plurality of combinations of {SCID and DMRS, ULRA} associated with one PI is the basis for a response to the PUSCH part.

Information about pairing between the combination of {RO, PI} for the RA preamble and the combination of {SCID and DMRS, ULRA} of the PUSCH part corresponding thereto may be preconfigured between the UE and the BS or may be broadcast by the BS to one or more UEs through a PBCH and/or a system information block (SIB). The UE selects 'the RA preamble based on a specific combination of {RO, PI}' and selects 'the PUSCH part based on a combination of {SCID and DMRS, ULRA} corresponding thereto'. The UE transmits MsgA by combining and transmitting the selected RA preamble and PUSCH part. The transmitted PUSCH part may include a UE ID and/or a BSR.

Meanwhile, when the RA preamble and the PUSCH part are configured by TDM in one MsgA, a CP applied to the RA preamble (e.g., an RACH-CP) and a CP applied to an OFDM symbol constituting the PUSCH part may be configured as follows.

- A CP length applied to all OFDM symbols in the PUSCH part may be configured to be the same as a CP length applied to the RA preamble; or
- a CP length applied to the first OFDM symbol in the PUSCH part is configured to be the same as the CP length applied to the RA preamble, and a CP length applied to the other symbols except for the first OFDM symbol in the PUSCH part may be configured to be smaller than the CP length applied to the RA preamble (e.g., the CP length applied to the other symbols except for the first OFDM symbol may be the same as a CP length applied to PUSCHs rather than the PUSCH part).

In one MsgA, when a resource on which the RA preamble is transmitted and a resource on which the PUSCH part is transmitted are located in the same frequency band or in a predetermined frequency range, the PUSCH part may be transmitted with an associated DMRS. Channel estimation for demodulation of the PUSCH part may be performed based on the RA preamble. In other words, in a specific case, the role of the DMRS of the PUSCH part may be replaced with the RA preamble.

In the embodiments of the present disclosure, a TC-RNTI may be used instead of an SCID. Alternatively, the SCID may be derived based on the TC-RNTI. Alternatively, an RNTI newly defined for MsgA, rather than the TC-RNTI, may be used instead of the SCID.

Transmission Format and Content Configuration of MsgB

MsgB for the 2-step RA procedure may differ in format and content configuration according to a type of RO information transmitted/indicated by the BS to the UE. The RO information transmitted by the BS to the UE may correspond to an RO of an RA preamble received by the BS from the UE. Hereinbelow, a PDCCH for scheduling MsgB may be referred to as a MsgB PDCCH.

Unless mentioned otherwise, MsgB may include a UE ID, a TAC, and/or PUCCH resource information regardless of the transmission/indication type of the RO information. The UE ID information may be used for contention resolution. The PUCCH resource information may be used for HARQ-ACK transmission for MsgB. MsgB may also include C-RNTI information to be used by the UE. MsgB may further include PDCCH search space (e.g., UE-specific search space (USS)) configuration information for monitoring a C-RNTI-based UE-specific PDCCH. The PDCCH search space configuration information may concern a time/frequency resource. The PDCCH search space configuration information may concern period/slot information for monitoring the PDCCH or performing blind decoding.

Configuration of MsgB according to the indication/transmission type of the RO information may be as follows.

First, the RO information may be indicated through an RNTI of the MsgB PDCCH. One or more MsgBs may be included in (one) PDSCH scheduled by the MsgB PDCCH. One MsgB may be configured by one MAC control element (CE) or a format similar to the MAC CE in terms of MAC. Information about to which PI value specific MsgB corresponds may be included in the PDSCH including MsgB. Alternatively, information about to which PI value specific MsgB corresponds may be transmitted in the specific MsgB.

Alternatively, the RO information may be indicated through an RNTI of the MsgB PDCCH, and (one) first PDSCH scheduled by the MsgB PDCCH may include one or more DL grants that schedule a second PDSCH. The second PDSCH may include one or more MsgBs. MsgBs included in the second PDSCH may correspond to one PI. The first PDSCH may include information about to which PI a DL grant for MsgB corresponds. Alternatively, the second PDSCH may include only one MsgB. All UE IDs may not always be included in MsgB. For example, a part of the UE IDs may be transmitted through the first PDSCH and the other part thereof may be transmitted in the second PDSCH or MsgB. The first PDSCH and the second PDSCH may be transmitted in the form of TDM which is continuous in time. In this case, the second PDSCH may be transmitted after the first PDSCH. Alternatively, MsgB included in the second PDSCH may correspond to one PI group. The first PDSCH may include information about to which PI group a DL grant for MsgB corresponds. MsgB included in the second PDSCH may correspond to one or plural PIs belonging to one PI group. The second PDSCH may include information about to which PI in a PI group MsgB corresponds. Alternatively, MsgB may include information about to which PI MsgB corresponds.

Alternatively, the RO information may be indicated through the RNTI of the MsgB PDCCH, and (one) PDSCH scheduled by the MsgB PDCCH may include one MsgB. One MsgB may correspond to one PI. A specific field in the MsgB PDCCH may indicate to which PI MsgB corresponds. MsgB may further include information related to RRC connection. PUCCH resource information for HARQ-ACK transmission for MsgB may be indicated through the MsgB PDCCH rather than MsgB. Alternatively, a PDSCH scheduled by the MsgB PDCCH may include one or more MsgBs. One or more MsgBs may correspond to one PI group. A specific field in the MsgB PDCCH may indicate to which PI group one or more MsgBs correspond. Alternatively, one or more MsgBs may correspond to one PI belonging to one PI group. The PDSCH scheduled by the MsgB PDCCH may include information about to which PI MsgB corresponds. Alternatively, MsgB may include information about to which PI MsgB corresponds.

Alternatively, the RO information may be indicated by a specific field of the MsgB PDCCH. The RNTI used for MsgB PDCCH transmission may be configured with respect to each PI value or each SCID value. The relation between the RNTI and the PI or SCID may be preconfigured for the UE. Alternatively, the relationship between the RNTI and the PI or SCID may be broadcast through the SIB and/or the PBCH. Alternatively, the RNTI may be determined by a function having the PI or SCID as an input value. An SCID value for scrambling the PUSCH part of MsgA may be derived based on the RNTI used for MsgB PDCCH transmission. The PDSCH scheduled by the MsgB PDCCH may include one MsgB corresponding to a PI associated with the RNTI used for MsgB PDCCH transmission. MsgB may further include RRC connection related information. PUCCH resource information for HARQ-ACK transmission for MsgB may be indicated through the MsgB PDCCH rather than MsgB. Alternatively, the PDSCH scheduled by the MsgB PDCCH may include one or more MsgBs. One or more MsgBs may correspond to one RO group. A specific field in the MsgB PDCCH may indicate to which RO group MsgB corresponds. One or more MsgBs may correspond to one RO belonging to one RO group. The PDSCH scheduled by the MsgB PDCCH may include information about to which RO MsgB corresponds. Alternatively, MsgB may include information about to which RO MsgB corresponds.

Alternatively, the RO information may be indicated by MsgB or by the PDSCH including MsgB. The RNTI used for MsgB PDCCH transmission may be configured with respect to each PI value or each SCID value. The relation between the RNTI and the PI or SCID may be preconfigured for the UE. Alternatively, the relationship between the RNTI and the PI or SCID may be broadcast through the SIB and/or the PBCH. Alternatively, the RNTI may be determined by a function having the PI or SCID as an input value. An SCID value for scrambling the PUSCH part of MsgA may be derived based on the RNTI used for MsgB PDCCH transmission. The PDSCH scheduled by the MsgB PDCCH may include one or more MsgBs. The PDSCH scheduled by the MsgB PDCCH may include information about to which RO MsgB corresponds. Alternatively, MsgB may include information about to which RO MsgB corresponds.

Alternatively, the RO information may be indicated by MsgB or by the PDSCH including MsgB. The RNTI used for MsgB PDCCH transmission may be configured with respect to each PI value or each SCID value. The relation between the RNTI and the PI or SCID may be preconfigured for the UE. Alternatively, the relationship between the RNTI and the PI or SCID may be broadcast through the SIB and/or the PBCH. Alternatively, the RNTI may be determined by a function having the PI or SCID as an input value. An SCID value for scrambling the PUSCH part of MsgA may be derived based on the RNTI used for MsgB PDCCH transmission. In this case, (one) first PDSCH scheduled by the MsgB PDCCH may include one or more DL grants for scheduling a second PDSCH. The first PDSCH may include information about to which RO a DL grant for MsgB corresponds. One second PDSCH may be transmitted including one MsgB corresponding to an RO associated with the DL grant based on the DL grant included in the first PDSCH. Instead of including all UE IDs in MsgB, a part of the UE IDs may be transmitted through the first PDSCH and the remaining part of the UE IDs may be transmitted through the second PDSCH or in MsgB. The first PDSCH and the second PDSCH may be transmitted in a TDM format that is continuous in time. In this case, the second PDSCH may be transmitted after the first PDSCH. Alternatively, MsgB included in the second PDSCH may correspond to one RO group. The first PDSCH may include information about to which RO group the DL grant for MsgB corresponds. MsgB included in the second PDSCH may correspond to one or plural ROs belonging to one RO group. The second PDSCH may include information about to which RO MsgB corresponds. Alternatively, MsgB may include information about to which RO MsgB corresponds.

Alternatively, a combination of {RO, PI} may be indicated through the RNTI of the MsgB PDCCH. The RNTI used for MsgB PDCCH transmission may be configured with respect to each combination of {RO, PI} corresponding to MsgA. The relationship between the RNTI and the combination of {RO, PI} may be preconfigured for the UE. Alternatively, the relationship between the RNTI and the combination of {RO, PI} may be broadcast through the SIB and/or the PBCH. Alternatively, the RNTI may be determined by a function having {RO, PI} as an input value. Alternatively, the SCID value may be derived based on the RNTI. In this case, the PDSCH scheduled by the MsgB PDCCH may include one MsgB corresponding to the combination of {RO, PI} associated with the RNTI used for MsgB PDCCH transmission. MsgB may further include RRC connection related information. PUCCH resource information for HARQ-ACK transmission for MsgB may be indicated through the MsgB PDCCH rather than MsgB. Alternatively, MsgB included in the PDSCH scheduled by the MsgB PDCCH may correspond to one combination of {RO, PI group}. In this case, the combination of {RO, PI group} may be indicated through the RNTI of the MsgB PDCCH. MsgB included in the PDSCH scheduled by the MsgB PDCCH may correspond to one combination of {RO group, PI}. In this case, the combination of {RO group, PI} may be indicated through the RNTI of the MsgB PDCCH. MsgB included in the PDSCH scheduled by the MsgB PDCCH may correspond to one combination of {RO group, PI group}. In this case, the combination of {RO group, PI group} may be indicated through the RNTI of the MsgB PDCCH. The relationship between the RNTI and a specific combination may be preconfigured for the UE. The RNTI may be determined by a function having a specific combination as an input value. The PDSCH scheduled by the MsgB PDCCH may include information about to which combination of {RO, PI} MsgB corresponds. Alternatively, MsgB may include information about to which combination of {RO, PI} MsgB corresponds.

By the configuration of MsgB described above, the UE checks whether a combination of {RO, PI} indicated by the MsgB PDCCH, the PDSCH scheduled by the MsgB PDCCH, and/or MsgB is equal to a combination of {RO, PI} corresponding to MsgA transmitted by the UE.

The UE confirms a UE ID included in MsgB and checks whether the confirmed UE ID is equal to an ID thereof. If the IDs are equal, the UE may transmit HARQ-ACK feedback (e.g., positive ACK) for MsgB reception based on a TAC and PUCCH resource information, included in MsgB.

The UE may monitor a PDCCH scheduled therefor and/or a PDSCH based on a C-RNTI and PDCCH USS information, included in MsgB. Alternatively, the UE may scramble a PUSCH based on the C-RNTI and the PDCCH USS information, included in MsgB.

In addition, a search space for the MsgB PDCCH may be differently configured with respect to an RO (or RO group) and/or a PI (or PI group). The search space for the MsgB PDCCH may be, for example, a PDCCH monitoring occasion or a PDCCH monitoring slot.

MsgA Retransmission Signaling and UE Operations

Upon transmitting MsgA, the UE may fail to transmit all of MsgA or fail to transmit only a PUSCH part. In this case, related signaling and UE operations may differ according to whether to retransmit all of MsgA or only the PUSCH part.

Detailed related signaling and UE operations in each retransmission range are as follows.

First, the UE may be configured to retransmit all of MsgA including an RA preamble. Retransmission of MsgA may be scheduling through a specific PDCCH. RO and/or PI information to be used for retransmission may be transmitted through the specific PDCCH. In addition, an RNTI and/or a specific field of the specific PDCCH may indicate the RO and PI information to be retransmitted. The RO and PI information to be retransmitted may be associated with an RA preamble from the UE, predetected by the BS (a related PUSCH part is not detected). When the RO and PI information to be retransmitted are indicated, the RO information may be indicated through the RNTI of the PDCCH, and the PI information may be indicated through the specific field of the PDCCH. Alternatively, when the RO and PI information to be retransmitted are indicated, the RNTI of the PDCCH may be configured based on the PI or SCID, and the RO information may be indicated through the specific field of the PDCCH. The SCID may be derived based on the RNTI of the PDCCH. The PDCCH including the RO and/or PI information to be used for retransmission may use the same RNTI as the MsgB PDCCH. The MsgB PDCCH and the PDCCH that includes the RO and/or PI information to be used for retransmission may be distinguished by a 1-bit field (or flag) included in each PDCCH. Scheduling information for MsgA retransmission may be automatically configured for MsgA corresponding to a combination of {RO, PI} indicated to be retransmitted by the PDCCH.

Alternatively, when the UE is configured to retransmit all of MsgA including the RA preamble, MsgA retransmission may be scheduled through the PDSCH scheduled by the MsgB PDCCH. The RO and/or PI information to be used for retransmission may be delivered through the PDSCH. In addition, the RO and PI information to be retransmitted may be indicated through the RNTI and/or the specific field of the MsgB PDCCH or may be indicated by the PDSCH. The RO and PI information to be retransmitted may be related to the RA preamble from the UE, predetected by the BS. When the RO and PI information to be retransmitted are indicated, the RO information may be indicated through the RNTI of the MsgB PDCCH, and the PI information may be indicated through the PDSCH scheduled by the MsgB PDCCH. Alternatively, when the RO and PI information to be retransmitted are indicated, the RNTI of the MsgB PDCCH is configured based on the PI or SCID, and the RO information may be indicated through the PDSCH scheduled by the MsgB PDCCH. The SCID may be derived based on the RNTI of the PDCCH. Alternatively, a combination of the RNTI and the specific field of the MsgB PDCCH may indicate the RO and PI information to be retransmitted. Scheduling information of the PDSCH for retransmitting MsgA and scheduling information of the PDSCH including MsgB may be distinguished by a 1-bit field (or flag) included in the MsgB PDCCH. The scheduling information may be automatically configured for MsgA corresponding to a combination of {RO, PI} indicated to be retransmitted by the PDSCH.

When the UE is configured to retransmit all of MsgA including the RA preamble, transmit power for retransmitted MsgA may increase and an RACH retransmission counter (e.g., PREAMBLE_TRANSMISSION_COUNTER) value may increase. When the transmit power for MsgA increases, the transmit power of all of MsgA including the RA preamble and the PUSCH part may increase. Alternatively, the PDCCH and/or PDSCH for scheduling MsgA retransmission may include information about transmit power configuration of MsgA. The PDCCH and/or PDSCH for scheduling MsgA retransmission may include information about whether to increase or maintain the RACH retransmission counter value.

Alternatively, all of MsgA may not be retransmitted and only the PUSCH part in MsgA may be retransmitted. MsgA retransmission may be scheduled through a specific PDCCH. The specific PDCCH may include SCID and DMRS information regarding MsgA. In addition, the specific PDCCH may include UL grant, TA, and/or transmit power control (TPC) information for the PUSCH including MsgA. In addition, the RNTI and/or the specific field of the specific PDCCH may indicate the RO and PI information to be retransmitted. The RO and PI information to be retransmitted may be related to the RA preamble from the UE, predetected by the BS (a related PUSCH part is not detected). In addition, the RNTI and/or the specific field of the specific PDCCH may indicate SCID information related to the PUSCH part instead of the PI information. When the RO and PI information and/or the SCID information to be retransmitted are indicated, the RO information may be indicated through the RNTI of the PDCCH, and the PI information (and/or the SCID information) may be indicated through the specific field of the PDCCH. Alternatively, when the RO and PI information and/or SCID information to be retransmitted are indicated, the RNTI of the PDCCH may be configured based on the PI or the SCID, and the RO information may be indicated through the specific field of the PDCCH. The SCID may be derived based on the RNTI of the PDCCH. The PDCCH including the RO, PI and/or SCID information to be used for retransmission may use the same RNTI as the MsgB PDCCH. The PDCCH and MsgB PDCCH including the RO, PI and/or SCID information to be used for retransmission may be distinguished by a 1-bit field (or flag) included in each PDCCH. In other words, whether the PDSCH scheduled by the PDCCH includes scheduling information for MsgA retransmission or includes MsgB (or includes scheduling information for the PDSCH including MsgB) may be indicated through a 1-bit field included in the PDCCH. The scheduling information may be automatically configured for the PUSCH part related to a combination of {SCID and DMRS, ULRA} corresponding to a combination of {RO, PI} indicated to be retransmitted by the PDCCH. Alternatively, the scheduling information may be configured based on a combination of the SCID and the DMRS corresponding to a combination of {RO, PI} indicated to be retransmitted by the PDCCH. In addition, the scheduling information may be configured based on the UL grant, TA, and/or TPC command information in the PDCCH for scheduling the PUSCH.

Alternatively, when only the PUSCH part in MsgA is retransmitted, MsgA retransmission may be scheduled through the PDSCH scheduled by the MsgB PDCCH. The PDSCH scheduled by the MsgB PDCCH may include SCID, DMRS, UL grant, TA, and/or TPC information for retransmission of the PUSCH part. In addition, the RO and PI (or SCID) information to be retransmitted may indicated through the RNTI and/or the specific field of the MsgB PDCCH or may be indicated through the PDSCH. The RO and PI information to be retransmitted may be related to the RA preamble from the UE, predetected by the BS (a related PUSCH part is not detected). When the RO and PI information to be retransmitted are indicated, the RO information may be indicated through the RNTI of the PDCCH, and the PI information may be indicated through the PDSCH scheduled by the MsgB PDCCH. Instead of the PI information, the SCID information associated with the PUSCH part may be indicated through the PDSCH scheduled by the MsgB PDCCH. Alternatively, when the RO and PI information and/or SCID information to be retransmitted are indicated, the RNTI of the MsgB PDCCH may be configured based on the PI or the SCID, and the RO information may be indicated through the PDSCH scheduled by the Msg PDCCH. Alternatively, the RO and PI (and/or SCID) information to be retransmitted may be indicated by a combination of the RNTI and the specific field of the MsgB PDCCH. Scheduling information for MsgA retransmission, included in the PDSCH scheduled by the MsgB PDCCH, may be distinguished by MsgB in the PDSCH and a 1-bit flag. Alternatively, when a first PDSCH schedules a second PDSCH, scheduling information for MsgA retransmission, included in the first PDSCH scheduled by the MsgB PDCCH, may be distinguished by scheduling information for the second PDSCH, included in the first PDSCH, and by a 1-bit flag. In other words, whether the PDSCH includes the scheduling information for MsgA retransmission or includes MsgB (or includes scheduling information for the PDSCH including MsgB) may be indicated through a 1-bit flag included in the MsgB PDCCH or in the PDSCH scheduled by the MsgB PDCCH. The scheduling information may be automatically configured for the PUSCH part related to a combination of {SCID and DMRS, ULRA} corresponding to a combination of {RO, PI} indicated to be retransmitted by the PDCCH. Alternatively, the scheduling information may be configured based on a combination of the SCID and the DMRS corresponding to a combination of {RO, PI} indicated to be retransmitted by the PDCCH. In addition, the scheduling information may be configured based on the UL grant, TA, and/or TPC command information in the PDCCH for scheduling the PUSCH.

If the UE is configured to retransmit only the PUSCH part except for the RA preamble, transmit power and an RACH retransmission counter of the PUSCH part may not automatically increase unless mentioned otherwise. Upon receiving a non-zero TPC command, the UE may configure the transmit power of the PUSCH part based on the corresponding command. Alternatively, the PDCCH and/or the PDSCH for scheduling MsgA retransmission may include information about transmit power configuration of the PUSCH part. The PDCCH and/or the PDSCH for scheduling MsgA retransmission may include information about whether to increase or maintain the RACH retransmission counter value.

The UE may be configured to retransmit all of MsgA including the RA preamble or retransmit only the PUSCH part in MsgA. Information about a range of a message to be retransmitted by the UE may be signaled through the PDSCH scheduled by the specific PDCCH or the MsgB PDCCH described above.

Operation of 2-Step RA Procedure and 4-Step RA Procedure

In a wireless communication system according to an embodiment of the present disclosure, the 2-step RA procedure and the 4-step RA procedure may be used in combination or selectively.

(1) RA Procedure after RRC Connection

In a state in which the UE and the BS are connected through RRC, a contention-based (CB) RA procedure or a contention-free (CF) RA procedure may be performed.

Upon transmitting a PUSCH part of MsgA in the CB RA procedure, the UE may include a C-RNTI instead of a UE ID. The PUSCH part may further include a BSR. The UE that has transmitted MsgA may monitor a MsgB PDCCH or a C-RNTI-based PDCCH. An operation of the UE related to the C-RNTI may be applied to both the case in which the UE performs the CB RA procedure for the purpose of transmitting a UL scheduling request (SR) and the case in which the BS commands the UE to perform the CB RA procedure by transmitting a PDCCH order signal.

When the UE monitors the MsgB PDCCH, MsgB received by scheduling of the MsgB PDCCH may include the C-RNTI instead of the UE ID. After checking whether a C-RNTI of MsgB is equal to a C-RNTI of the UE, the UE transmits HARQ-ACK for MsgB reception. HARQ-ACK for MsgB reception may be transmitted based on a TAC included in MsgB.

When the UE performs monitoring of the C-RNTI-based PDCCH rather than the MsgB PDCCH, the UE determines that contention has been resolved upon detecting the C-RNTI-based PDCCH after transmitting MsgA. A DCI format type of the PDCCH or UL/DL of data scheduled by the PDCCH may be irrelevant to whether the UE has resolved contention. The TAC may be indicated by the C-RNTI-based PDCCH or by the PDSCH scheduled by the C-RNTI-based PDCCH.

In the CF RA procedure, upon transmitting the PUSCH part of MsgA, the UE may include the BSR (and/or the C-RNTI rather than the UE ID). The UE that transmitted MsgA may monitor the MsgB PDCCH or the PDCCH based on the C-RNTI thereof.

When the UE monitors the MsgB PDCCH, MsgB received by scheduling of the MsgB PDCCH may include the C-RNTI instead of the UE ID. Alternatively, MsgB may include neither the UE ID nor the C-RNTI. After checking whether a C-RNTI of MsgB is equal to a C-RNTI of the UE, the UE transmits HARQ-ACK for MsgB reception. HARQ-ACK for MsgB reception may be transmitted based on the TAC included in MsgB.

When the UE performs monitoring of the C-RNTI-based PDCCH rather than the MsgB PDCCH, the UE may receive the TAC through the C-RNTI-based PDCCH or through the PDSCH scheduled by the C-RNTI-based PDCCH after transmitting MsgA.

The CF RA procedure is indicated through transmission of the PDCCH order signal by the BS. Through the PDCCH order signal, information about a combination of {RO, PI} for an RA preamble included in MsgA to be transmitted by UE and/or a combination of {SCID and DMRS, ULRA} for the PUSCH part corresponding to the combination of {RO, PI} may be signaled.

As a detailed example, if a plurality of bits constituting an RA field in the C-RNTI-based PDCCH (DCI) indicates invalid resource allocation (e.g., if all RA field bits indicate '1' in a state in which a resource indication value (MV) resource allocation scheme (of an RB or RBG unit) is indicated or if all RA field bits indicate '0' in a state in which a bit map resource allocation scheme (of an RB or RBG unit) is indicated), the UE may consider a method of performing an operation in a state in which the UE regards/interprets such resource allocation indication as indication of the TAC through the PDCCH (DCI) (without PDSCH scheduling). In this case, the TAC may be indicated through the remaining field (e.g., an MC S/transport block size (TBS), a HARQ process ID, and/or a new data indicator (NDI)/redundancy version (RV)) in the DCI. (In this case, the UE may perform an operation of feeding back/transmitting an ACK response to DCI reception by applying an ACK/NACK (A/N) transmission timing and an A/N PUCCH resource indicated through an A/N timing indication field and an A/N PUCCH resource allocation field in the DCI.

In contrast, if valid resource allocation is indicated through the RA field in the C-RNTI-based PDCCH (DCI), the UE may perform an operation in a state in which the UE regards/interprets the PDCCH (DCI) as a normal PDCCH (for scheduling PDSCH transmission).

Meanwhile, the same method may be applied when the PDCCH (DCI) is replaced with a UL grant PDCCH (DCI).

(2) Selection of 2-Step RA Procedure and 4-Step RA Procedure

One of the 2-step RA procedure and the 4-step RA procedure may be selected by the value/range of a TBS to be transmitted by the UE. The value/range of a TBS transmittable through a PUSCH part included in MsgA in the 2-step RA procedure may be defined/configured differently from the value/range of a TBS transmittable through Msg3 in the 4-step RA procedure. The value/range of a TBS related to each RA procedure may be preconfigured for the UE/BS and may be broadcast through an SIB/PBCH by the BS. In other words, which format of the 2-step RA procedure and the 4-step RA procedure with respect to each TBS value/range is the basis for UE transmission may be defined/configured. Such definition/configuration may be preconfigured or may be broadcast through the SIB/PBCH.

The UE may transmit MsgA or Msg1 by selecting an RA procedure through which a TBS preferred thereby is transmittable. Next, information about the TBS may be indicated through the PDCCH that schedules UL retransmission or the PDSCH. If the TBS has a value transmittable through an RA procedure rather than an RA procedure first selected by the UE, the UE performs TBS transmission based on a UL transmission format of the RA procedure rather than the first selected RA procedure.

In addition, if the number of times of retransmission of Msg3 in the 4-step RA procedure exceeds a preset threshold value, the UE may stop performing the 4-step RA procedure and perform the 2-step RA procedure. The UE may transmit MsgA by the 2-step RA procedure. The threshold value may be preset or may be broadcast through signaling by the BS such as the PBCH/SIB.

Alternatively, if the number of times of retransmission of MsgA (or the PUSCH part in MsgA) in the 2-step RA procedure exceeds the preset threshold value, the UE may stop performing the 2-step RA procedure and perform the 2-step RA procedure. The UE may transmit Msg1 by the 4-step RA procedure. The threshold value may be preset or may be broadcast through signaling by the BS such as the PBCH/SIB.

The TBS value/range transmittable through MsgA (or the PUSCH part in MsgA) in the 2-step RA procedure may be differently set with respect to each PI (or PI group), each RO (or RO group), or each combination of {PI, RO}. The TBS vale/range may be preset or may be broadcast through signaling by the BS such as the PBCH/SIB. In other words, which one of the PI (or PI group), the RO (or RO group), or the combination of {PI, RO} is the basis for MsgA transmission with respect to each TBS value/range may be defined/configured. The UE may select a PI (or PI group), an RO (or RO group), or a combination of {PI, RO} corresponding to a TBS preferred thereby and transmit MsgA corresponding to the selected PI (or PI group), RO (or RO group), or combination of {PI, RO}.

Additionally, resources allocated to the PUSCH part of MsgA may be differently defined/configured with respect to each TBS value/range transmittable through MsgA (and/or with respect to (re)transmission of the PUSCH part). Allocation of the resources may be preconfigured or may be broadcast through signaling by the BS such as the PBCH/SIB. For example, when the time resources (e.g., symbols) are the same, more frequency resources (e.g., RBs) may be allocated to the PUSCH part of MsgA corresponding to transmission of a larger TBS. Alternatively, when frequency resources (e.g., RBs) are the same, more time resources (e.g., symbols) may be allocated to transmission of a larger TBS. Alternatively, when time resources (e.g., symbols) are the same, more frequency resources (e.g., RBs) may be allocated to (m+k)-th retransmission of the PUSCH part than to m-th transmission of the PUSCH part. Alternatively, when frequency resources (e.g., RBs) are the same, more time resources (e.g., symbols) may be allocated to (m+k)-th retransmission of the PUSCH part than to m-th transmission of the PUSCH part. In this case, m and k are positive integers.

Additionally, if the number of times of retransmission of MsgA (or the PUSCH part included in MsgA) corresponding to a specific TSB in the 2-step RA procedure exceeds the preset value, the UE may transmit MsgA corresponding to a TSB smaller than the specific TBS. The threshold value may be preset or may be broadcast through signaling by the BS such as the PBCH/SIB.

Alternatively, one of the 2-step RA procedure and the 4-step RA procedure may be selected in consideration of transmit power of the UE.

Specifically, the UE may select one of the 2-step RA procedure and the 4-step RA procedure according to measured reference signal received power (RSRP), path loss, and/or required transmit power. Transmission of the PUSCH part included in MsgA in the 2-step RA procedure may require more resources than transmission of the PUSCH including Msg3 in the 4-step RA procedure. Power required for PUSCH part transmission in the 2-step RA procedure may differ from power required for PUSCH transmission in the 4-step RA procedure. Alternatively, maximum transmit power of the UE may be lower than transmit power required in the 2-step RA procedure or the 4-step RA procedure. According to a PUSCH transmit power desired by the BS and/or a PUSCH transmit power required to compensate for path loss in the UE, one of the 2-step RA procedure and the 4-step RA procedure may be selected. A condition of switching between MsgA transmission in the 2-step RA procedure and Msg1 transmission in the 4-step RA procedure and/or a condition of switching between MsgA transmission in the 2-step RA procedure and Msg3 transmission in the 4-step RA procedure may be configured based on the PUSCH transmit power desired by the BS and/or the PUSCH transmit power required to compensate for path loss in the UE.

Alternatively, one of the 2-step RA procedure and the 4-step RA procedure may be selected based on a U-band channel and an LBT operation.

Specifically, the UE may select one of the 2-step RA procedure and the 4-step RA procedure based on an LBT result/statistics for a U-band wireless channel. For example, the UE may select one of the 2-step RA procedure and the 4-step RA procedure according to an idle/busy level of the U-band channel based on LBT. The idle/busy level may be determined based on whether an idle or busy possibility is above or under a specific percent. Alternatively, the idle/busy level may be determined based on whether a ratio between idle and busy states is above or under a specific value. The specific percent and/or the specific value may be preset or may be broadcast through signaling by the BS such as the PBCH/SIB.

Alternatively, a maximum retransmission counter value for MsgA or a maximum failure counter value for LBT may be defined/configured. The maximum retransmission counter value and the maximum failure counter value may be defined/configured separately from a maximum retransmission counter value for Msg1 of the 4-step RA procedure. If the number of times of (re)transmission for MsgA exceeds a maximum retransmission counter value for MsgA, the 2-step RA procedure may switch to the 4-step RA procedure. The UE may transmit Msg1 by the 4-step RA procedure.

Alternatively, if the number of times of LBT failure (the number of times by which the U-band is determined to be a busy state) for first UL transmission (Msg1 or MsgA transmission) of a specific RA procedure exceeds the maximum failure counter value, the specific RA procedure may switch to another RA procedure. The maximum retransmission counter value for MsgA or the maximum failure counter value for LBT may be preset or may be broadcast through signaling by the BS such as the PBCH/SIB.

Alternatively, an LBT type for MsgA transmission of the 2-step RA procedure and the LBT type for Msg1 of the 4-step RA procedure may be differently defined/configured. For example, the UE may attempt to perform both LBT of an LBT type for MsgA of the 2-step RA procedure and LBT of an LBT type for Msg1 of the 4-step RA procedure and select an RA procedure including message transmission corresponding to an LBT type of successful LBT.

(3) Switching Between 2-Step RA Procedure and 4-Step RA Procedure

Retransmission of a PUSCH part of MsgA may be performed with the type/format of Msg3 instead of the type of the PUSCH part. A PDCCH/PDSCH that schedules retransmission of the PUSCH part of MsgA may be indicated to be performed by switching to the type/format of Msg3. The PDCCH/PDSCH that schedules retransmission of the PUSCH part of MsgA may include a TC-RNTI. The UE may perform scrambling for the PUSCH including Msg3 based on the received TC-RNTI and transmit the scrambled PUSCH. Contention resolution for Msg3 may be performed by receiving MsgB or Msg4 by the UE. The UE may monitor a MsgB PDCCH or a TC-RNTI-based PDCCH for contention resolution. MsgB transmitted for contention resolution may not include separate C-RNTI information and the UE may use the TC-RNTI as a C-RNTI.

In regard to power ramping during switching between the 2-step RA procedure and the 4-step RA procedure, even when there is switching between the RA procedures, transmit power of MsgA or Msg1 after switching may not increase relative to transmit power of Msg1 or MsgA before switching. In regard to an RACH counter during switching between the 2-step RA procedure and the 4-step RA procedure, an RACH retransmission counter value may not increase or the RACH retransmission counter value may not increase and may be maintained, even when there is switching between the RA procedures. Alternatively, whether the transmit power of Msg1 or MsgA after switching increases or is maintained relative to transmit power of MsgA or Msg1 before switching may be signaled through the PDCCH/PUSCH for triggering switching between the RA procedures. In addition, whether the RACH retransmission counter value increases or is maintained may be signaled through the PDCCH/PDSCH for triggering switching between the RA procedures.

(4) Sharing of PRACH Resource Between 2-Step RA Procedure and 4-Step RA Procedure For an RA preamble constituting MsgA in the 2-step RA procedure (hereinafter, a 2-step RP) and an RA preamble corresponding to Msg1 in the 4-step RA procedure (hereinafter, a 4-step RP), a transmission resource may be configured as follows.

First, an RO is shared between the two RA preambles and different PI values may be set between the 2-step RP and the 4-step RP (for one RO) (shared RO but separate preambles for 2-step and 4-step RACH). (Option 1)

Alternatively, a PI may be shared between the two RA preambles and different RO values may be set between the 2-step RP and the 4-step RP. (Option 2)

Alternatively, the two RA preambles may use different ROs and PIs. (Option 3)

Alternatively, whether the RO and/or the PI is shared or different ROs and PIs are used (e.g., which one of Option 1/2 (or Option 1/2/3, Option 1/3, or Option 2/3) is applied) between the two RA preambles may be broadcast through signaling by the BS such as the PBCH/SIB.

When the RO is shared and different PI values are set between the two RA preambles, the following description may be considered.

Figure 10:
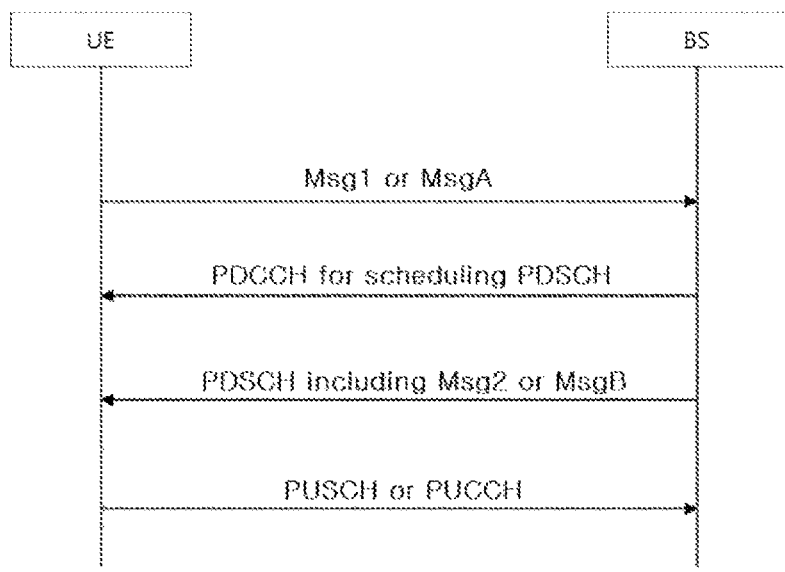

FIG. 10 illustrates an operation of a UE and a BS when an RO is shared and different PI values are set between two RA preambles. First, the UE transmits a message for RA, and the message may be MsgA or Msg1. In this case, an RO usable by the 2-step RP in MsgA and an RO usable by the 4-step RP in Msg1 may be the same. Different PIs may be used according to whether the UE transmits the 2-step RP or the 4-step RP.

Next, the UE should receive a PDCCH that schedules a PDSCH including MsgB or Msg2, corresponding to the message transmitted thereby. In this case, if an RNTI of the PDCCH corresponds to RO information, the UE may not discern, through the RNTI, whether the PDSCH scheduled by the PDCCH includes MsgB or Msg2.

To solve this problem, a DCI payload size corresponding to a PDCCH that schedules MsgB and a DCI payload size corresponding to a PDCCH that schedules an RAR may be configured to have different sizes. The UE may perform PDCCH blind decoding by assuming that a DCI payload size when the UE transmits MsgA and a DCI payload size when the UE transmits Msg2 are different. In other words, the UE may perform PDCCH blind decoding by expecting that different DCI sizes will be used according to an RO selected thereby.

Alternatively, which one of MsgB and Msg2 a PDCCH schedules may be directly indicated through a 1-bit flag of the PDCCH that schedules MsgB or Msg2. The UE may discern whether a PDSCH scheduled by the PDCCH includes MsgB or Msg2 by checking the 1-bit flag of the PDCCH.

Alternatively, the RNTI of the PDCCH that schedules MsgB or Msg2 may be derived based on information other than RO information. For example, the RNTI may be derived by a function based on an input value varying with whether the RA procedure is a 2-step procedure or a 4-step procedure. The UE may discern whether the PDSCH scheduled by the PDCCH includes MsgB or Msg2 by checking the RNTI of the PDCCH.

Alternatively, both MsgB corresponding to the 2-step RP and the RAR corresponding to the 4-step RP may be transmitted in the PDSCH scheduled by the PDCCH based on the RNTI (determined according to the RO). In this case, a legacy UE (L-UE) that does not support the 2-step RA procedure may understand/apply only a 4-step RA format, and an advanced UE (A-UE) may understand/apply both a 4-step RA format and the 2-step RA format. In this case, a payload size of MsgB and a payload size of Msg2 may be equal but may be different as illustrated in FIG. 11. As illustrated in FIG. 11(a), if the payload size of MsgB and the payload size of Msg2 differ and are mapped to the PDSCH without determined order, the legacy UE (L-UE 1) may not understand the foregoing mapped payload format of MsgB of the advanced UE (A-UE 1) and may not discern the location of the payload of Msg2 corresponding thereto. In consideration of this case, an RAR corresponding to the 4-step RP may first be mapped and then MsgB corresponding to the 2-step RP may be mapped in the PDSCH (payload)

as illustrated in FIG. 11(b). Here, the meaning of first mapping may imply mapping to a lower or faster bit index part in one PDSCH. Thereby, the L-UE may successfully receive Msg2 thereof regardless of whether MsgB is present in the PDSCH.

Upon receiving Msg2 by transmitting Msg1, the UE may transmit Msg3 corresponding to Msg2 through a PUSCH. Upon receiving MsgB by transmitting MsgA, the UE may transmit HARQ-ACK feedback for MsgB reception through the PUCCH.

PUCCH resource allocation through MsgB (or the MsgB PDCCH) and HARQ-ACK feedback (for MsgB reception) through the PUCCH resource may be replaced with PUSCH resource allocation through MsgB (or the MsgB PDCCH) and PUSCH transmission (by applying a TAC received through MsgB/MsgB PDCCH).

Implementation Example

One or more of the above-described operations may be organically combined to implement the embodiments of the present disclosure.

For example, a communication apparatus (e.g., a UE) for implementing the present disclosure may select a specific RA procedure through one or more of the operations described in the <Selection of 2-step RA procedure and 4-step RA procedure>. When the communication apparatus selects the 4-step RA procedure, the 4-step RA procedure described as a general procedure may be performed.

If the communication apparatus selects the 2-step RA procedure, MsgA may be transmitted based on one or more of the formats described through <MsgA transmission format and parameter configuration>. A MsgB PDCCH and MsgB, corresponding to MsgA, may conform to one or more of the formats described in the <MsgB transmission format and content configuration>. When the MsgB PDCCH or MsgB is not successfully received, all of MsgA or a PUSCH part may be retransmitted through one or more of the operations described in <MsgA retransmission signaling and UE operations>. In this case, the PUSCH part may be retransmitted in the form of Msg3 based on one of the operations described in <Switching between 2-step RA procedure and 4-step RA procedure>.

When MsgA or Msg1 is transmitted, an RO in which an RA preamble is transmitted may be configured based on one or more of configurations described in <Sharing of PRACH resource between 2-step RA procedure and 4-step RA procedure>.

Figure 12:
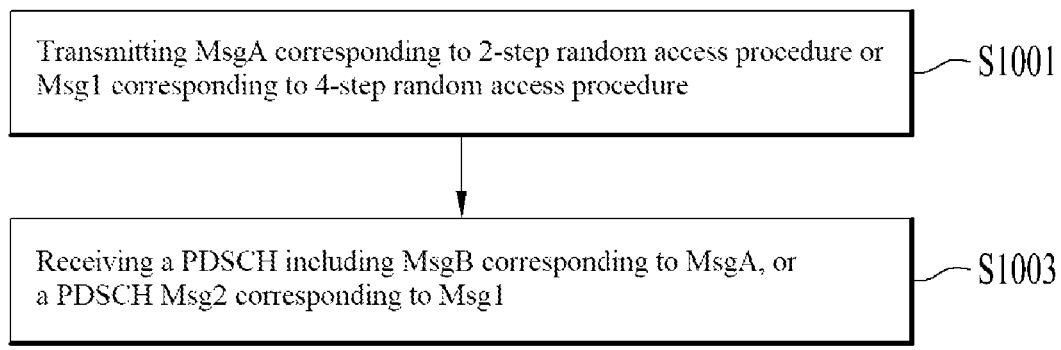

One of embodiments implemented by a combination of the operations described in the present disclosure may be as illustrated in FIG. 12.

FIG. 12 is a flowchart of a signal transmission and reception method according to an embodiment of the present disclosure.

Referring to FIG. 12, an embodiment of the present disclosure implemented by a communication apparatus may include transmitting MsgA corresponding to a 2-step RA procedure and Msg1 corresponding to a 4-step RA procedure to a network (S1001) and receiving a PDSCH including MsgB corresponding to MsgA or Msg2 corresponding to Msg1 from the network (S1003).

Specifically, MsgA may include a first PRACH and a PUSCH part, and Msg1 may include a second PRACH.

The relationship between the first PRACH and the second PRACH may be configured as one of Option 1 and Option 2 by the network. Option 1 may be an option in which an RO for transmitting the first PRACH and RO for transmitting the second PRACH are differently configured. Option 2 may be an option in which the RO for transmitting the first PRACH and the RO for transmitting the second PRACH are shared, and a PI of the first PRACH and a PI of the second PRACH are differently configured.

Alternatively, a specific network may not select one of Option 1 and Option 2 and may be configured to use only one option. UEs belonging to a network configured to use only Option 1 use different ROs upon transmitting the first PRACH and transmitting the second PRACH. UEs belonging to a network configured to use only Option 2 do not distinguish between ROs upon transmitting the first PRACH and transmitting the second PRACH and use different PIs of the first PRACH and the second PRACH.

Which one of MsgA and Msg1 is transmitted may be selected based on a TBS of a transport block to be transmitted by the communication apparatus and on transmit power necessary for transmission of the transport block. Both transmission of MsgA and Msg1 and reception of MsgB and Msg2 may be performed in a U-band.

The PUSCH part included in MsgA may be defined by a PO for transmission of the PUSCH part and by a DMRS sequence. The PUSCH part included in MsgA may be scrambled based on an SCID associated with the RNTI and the PI. The association relationship between the RNTI and PI and the SCID may depend on one of specific relationships described in MsgA or MsgB.

An RO for transmission of the first PRACH may correspond to one or plural POs for transmission of the PUSCH part.

An RNTI included in a PDCCH that schedules a PDSCH including MsgB may be associated with the RO for transmission of the first PRACH. Specifically, information of the RO in which the first PRACH is transmitted may be indicated through the RNTI.

MsgB may include an ID (e.g., a UE ID), a C-RNTI, and a TAC, for contention resolution. MsgB may further include resource allocation information for transmission of HARQ-ACK information for MsgB.

The communication apparatus may transmit, to the network, the HARQ-ACK information for MsgB based on the resource allocation information and the TAC.

The PDSCH including MsgB or Msg2 for the communication apparatus may further include MsgB or Msg2 for another communication apparatus. In this case, the PDSCH may include a plurality of MsgBs and a plurality of Msg2s for other communication apparatuses. Here, the plural Msg2s may be mapped to lower bit indexes than the plural MsgBs in the PDSCH. Alternatively, the PDSCH may include the plural MsgBs or Msg2s, and the plural MsgBs or Msg2s may be indicated by a (1-bit) flag included in the PDCCH that schedules the PDSCH. Alternatively, the PDSCH may include the plural MsgBs or Msg2s, and a DCI payload size of the PDCCH that schedules the PDSCH including the plural MsgBs and a DCI payload size of the PDCCH that schedules the PDSCH including the plural Msg2s may be differently configured.

Alternatively, the UE may determine transmission of the PRACH and determine whether to transmit the PUSCH part based on the RO in which the PRACH is to be transmitted and the PI of the PRACH.

For example, the UE may receive configuration for a first RO group for the 2-step RA procedure and configuration for a second RO group for the 4-step RA procedure from the BS. Next, the UE may transmit the PRACH. When an RO belongs to the first RO group for the 2-step RA procedure, the UE may transmit the PUSCH part associated with the PRACH and, when the RO belongs to the second RO group for the 4-step RA procedure, the UE may not transmit the PUSCH part associated with the PRACH.

The UE may receive configuration for a first PI group for the 2-step RA procedure and configuration for a second PI group for the 4-step RA procedure to the BS. Next, the UE may transmit the PRACH. When a PI belongs to the first PI group for the 2-step RA procedure, the UE may transmit the PUSCH part associated with the PRACH and, when the PI belongs to the second PI group for the 4-step RA procedure, the UE may not transmit the PUSCH part associated with the PRACH.

In addition to the operation of FIG. 12 described above, one or more of the operations described with reference to FIGS. 1 to 11 may be combined to be additionally performed.

Discontinuous Reception (DRX) Operation

The UE may perform the DRX operation while performing the procedures and/or methods described/suggested above. A UE with which DRX is configured can reduce power consumption by discontinuously receiving DL signals. DRX may be performed in Radio Resource Control (RRC)_IDLE state, RRC_INACTIVE state, and RRC_CONNECTED state. In the RRC IDLE state and RRC_INACTIVE state, the DRX is used to receive paging signals discontinuously. Hereinafter, DRX performed in the RRC_CONNECTED state will be described (RRC_CONNECTED DRX).

Figure 13:
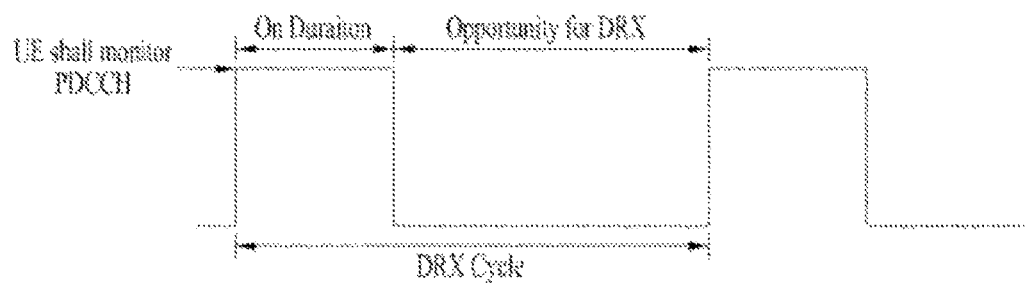

FIG. 13 illustrates the DRX cycle (RRC_CONNECTED state).

Referring to FIG. 13, the DRX cycle consists of On Duration and Opportunity for DRX. The DRX cycle defines a time interval with which On Duration is periodically repeated. On Duration represents a time period during which the UE monitors to receive the PDCCH. When DRX is configured, the UE performs PDCCH monitoring during On Duration. If there is a PDCCH successfully detected during PDCCH monitoring, the UE operates an inactivity timer and maintains an awake state. On the other hand, if there is no PDCCH successfully detected during PDCCH monitoring, the UE enters a sleep state after the On Duration is over. Accordingly, when DRX is configured, PDCCH monitoring/reception may be discontinuously performed in the time domain in performing the procedure and/or method described/proposed above. For example, when DRX is set, a PDCCH reception opportunity (e.g., a slot having a PDCCH search space) in the present disclosure may be set discontinuously according to the DRX configuration. On the other hand, when DRX is not set, PDCCH monitoring/reception may be continuously performed in the time domain in performing the procedures and/or methods described/proposed above. For example, when DRX is not set, a PDCCH reception opportunity (e.g., a slot having a PDCCH search space) may be continuously set in the present disclosure. Meanwhile, regardless of whether or not DRX is set, PDCCH monitoring may be restricted in a time period set as a measurement gap.

Table 6 shows the procedures of the UE related to the DRX (RRC_CONNECTED state). Referring to Table 6, DRX configuration information is received through higher layer (e.g., RRC) signaling, and whether DRX ON/OFF is controlled by a DRX command of the MAC layer. When DRX is configured, the UE may discontinuously perform PDCCH monitoring in performing the procedures and/or methods described/suggested in the present disclosure, as illustrated in FIG. 13.

TABLE 6

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

Here, the MAC-CellGroupConfig includes configuration information required to set a medium access control (MAC) parameter for a cell group. MAC-CellGroupConfig may also include configuration information about DRX. For example, MAC-CellGroupConfig defines DRX and may include information as follows.

Value of drx-OnDurationTimer: Defines the length of the start section of the DRX cycle Value of drx-InactivityTimer: Defines the length of the time interval in which the UE is awake after the PDCCH opportunity in which the PDCCH indicating initial UL or DL data is detected Value of drx-HARQ-RTT-TimerDL: Defines the length of the maximum time interval from receiving DL initial transmission until DL retransmission is received.

Value of drx-HARQ-RTT-TimerDL: Defines the length of the maximum time interval after the grant for initial UL transmission is received until the grant for UL retransmission is received.

drx-LongCycleStartOffset: Defines the time length and start point of the DRX cycle drx-ShortCycle (optional): Defines the time length of the short DRX cycle Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH opportunity while maintaining the awake state.

Before the operation described with reference to FIG. 12 (e.g., before the step S1001), the UE may perform such a DRX-related operation. The UE may perform PDCCH monitoring during On Duration, and perform one or more of the random access procedures when there is a PDCCH successfully detected during PDCCH monitoring, according to an embodiment of the present disclosure.

Example of communication system to which the present disclosure is applied

Various descriptions, functions, procedures, proposals, methods, and/or flowcharts disclosed in the present specification may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
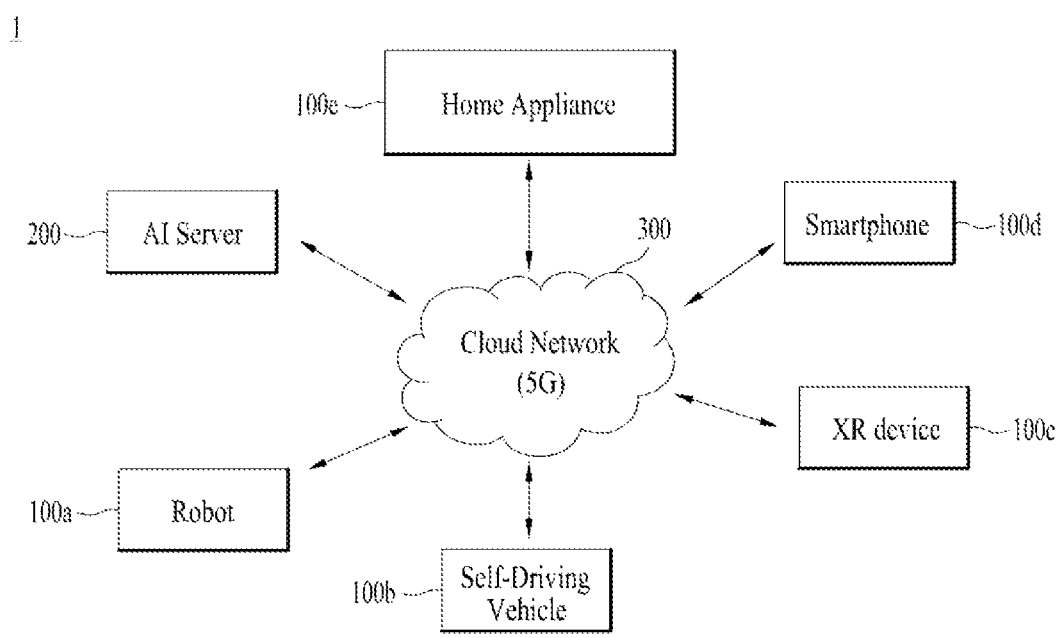
FIGS. 14 to 17 illustrate devices according to an embodiment of the present disclosure.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless devices to which the present disclosure is applied

Figure 15:
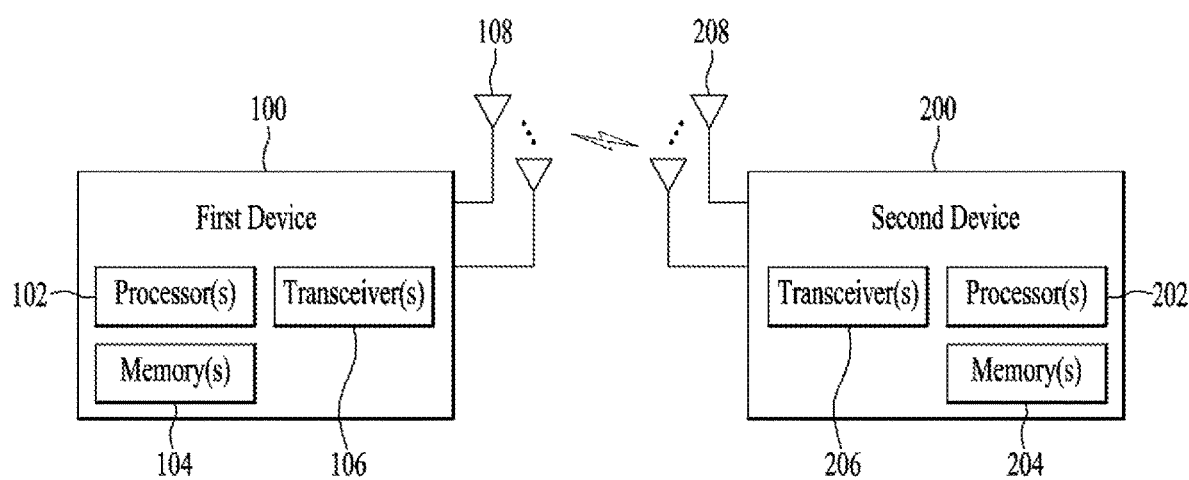

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of using wireless devices to which the present disclosure is applied

Figure 16:
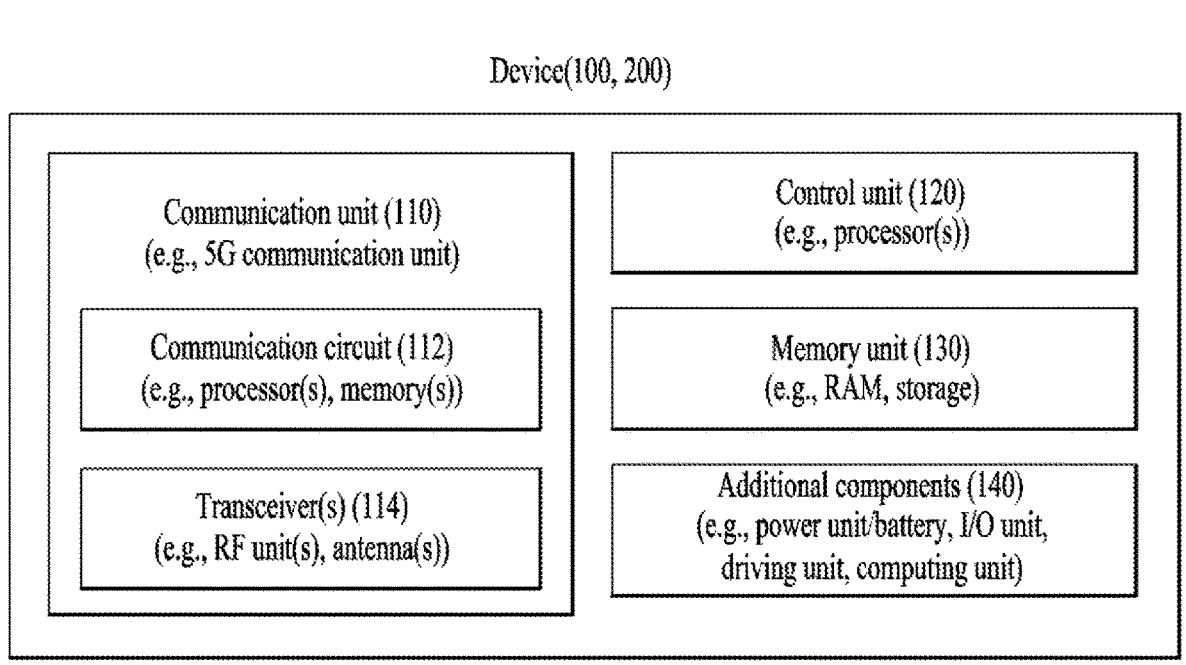

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
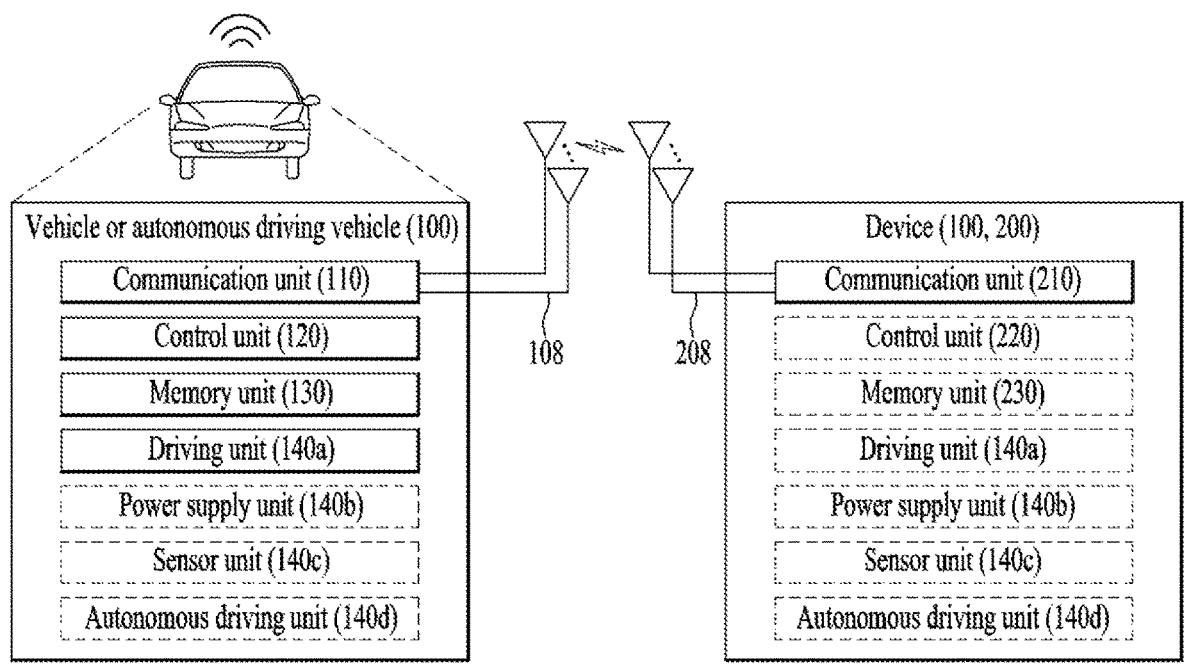

Example of vehicle or autonomous driving vehicle to which the present disclosure is applied FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As disclosed above, the present disclosure is applicable to various wireless communication system.

What is claimed is:

1. A method for performing a random access (RA) procedure by a user equipment (UE) in a wireless communication system, the method comprising:
   determining which RA procedure is set among a 2-step RA procedure and a 4-step RA procedure based on a Reference Signal Received Power (RSRP) measured in a downlink bandwidth part (DL BWP);
   based on the 2-step RA procedure being set, transmitting of a message A (msgA) including both a RA preamble and a physical uplink shared channel (PUSCH);
   based on the 4-step RA procedure being set, transmitting a message 1 (msg1) consisting of the RA preamble;
   establishing a Radio Resource Control (RRC) connection based on the RA procedure; and
   based on (1) the RRC connection being established and (2) Discontinuous Reception (DRX) operation being configured, monitoring a Physical Downlink Control Channel (PDCCH) discontinuously using a DRX operation.

2. The method of claim 1, wherein the level of the RSRP is measured based on a downlink reference signal.

3. The method of claim 1, wherein, in the 2-step RA procedure, a transmission of the RA preamble is performed in an RA occasion (RO) among a plurality of ROs, and a resource for the PUSCH is determined in association with the RA.

4. The method of claim 3, wherein the RO includes a time-frequency resource used for the transmission of the RA preamble, and the resource for the PUSCH includes at least a time-frequency resource, a scrambling identity (ID) or a demodulation reference signal (DMRS) resource.

5. A user equipment (UE) configured to perform a random access (RA) procedure in a wireless communication system, the UE comprising:
   at least one radio frequency (RF) module;
   at least one processor; and
   at least one computer memory operably connectable to the at least one processor and storing instructions that, when executed, cause the at least one processor to perform operations comprising:
      determining which RA procedure is set among a 2-step RA procedure and a 4-step RA procedure based on a level of Reference Signal Received Power (RSRP) measured in a downlink bandwidth part (DL BWP);
      based on the 2-step RA procedure being set, transmitting of a message A (msgA) including both a RA preamble and a physical uplink shared channel (PUSCH);
      based on the 4-step RA procedure being set, transmitting a message 1 (msg1) consisting of the RA preamble;
      establishing a Radio Resource Control (RRC) connection based on the RA procedure; and
      based on (1) the RRC connection being established and (2) Discontinuous Reception (DRX) operation being configured, monitoring a Physical Downlink Control Channel (PDCCH) discontinuously using a DRX operation.

6. The UE of claim 5, wherein the level of the RSRP is measured based on a downlink reference signal.

7. The UE of claim 5, wherein, in the 2-step RA procedure, a transmission of the RA preamble is performed in an RA occasion (RO) among a plurality of ROs, and a resource for the PUSCH is determined in association with the RA.

8. The UE of claim 7, wherein the RO includes a time-frequency resource used for the transmission of the RA preamble, and the resource for the PUSCH includes at least a time-frequency resource, a scrambling identity (ID) or a demodulation reference signal (DMRS) resource.

9. A device used for a user equipment (UE) to perform a random access (RA) procedure in a wireless communication system, the device comprising:
   at least one processor; and
   at least one computer memory operably connectable to the at least one processor and storing instructions that, when executed, cause the at least one processor to perform operations comprising:
      determining which RA procedure is set among a 2-step RA procedure and a 4-step RA procedure based on Reference Signal Received Power (RSRP) measured in a downlink bandwidth part (DL BWP);
      based on the 2-step RA procedure being set, transmitting of a message A (msgA) including both a RA preamble and a physical uplink shared channel (PUSCH);
      based on the 4-step RA procedure being set, transmitting a message 1 (msg1) consisting of the RA preamble;
      establishing a Radio Resource Control (RRC) connection based on the RA procedure; and
      based on (1) the RRC connection being established and (2) Discontinuous Reception (DRX) operation being configured, monitoring a Physical Downlink Control Channel (PDCCH) discontinuously using a DRX operation.

10. The device of claim 9, wherein the level of the RSRP is measured based on a downlink reference signal.

11. The device of claim 9, wherein, in the 2-step RA procedure, a transmission of the RA preamble is performed in an RA occasion (RO) among a plurality of ROs, and a resource for the PUSCH is determined in association with the RA.

12. The device of claim 11, wherein the RO includes a time-frequency resource used for the transmission of the RA preamble, and the resource for the PUSCH includes at least a time-frequency resource, a scrambling identity (ID) or a demodulation reference signal (DMRS) resource.

* * * * *